(12) United States Patent
Wu et al.

(10) Patent No.: US 11,956,769 B2
(45) Date of Patent: *Apr. 9, 2024

(54) METHOD AND DEVICE IN UE AND BASE STATION USED FOR WIRELESS COMMUNICATION

(71) Applicant: Dido Wireless Innovations LLC, Frisco, TX (US)

(72) Inventors: KeYing Wu, Shanghai (CN); Xiaobo Zhang, Shanghai (CN)

(73) Assignee: Dido Wireless Innovations LLC, Frisco, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/715,972

(22) Filed: Apr. 8, 2022

(65) Prior Publication Data

US 2022/0232576 A1    Jul. 21, 2022

Related U.S. Application Data

(63) Continuation of application No. 16/745,350, filed on Jan. 17, 2020, now Pat. No. 11,337,230, which is a
(Continued)

(51) Int. Cl.
*H04W 72/04* (2023.01)
*H04L 5/00* (2006.01)
(Continued)

(52) U.S. Cl.
CPC ........... *H04W 72/12* (2013.01); *H04L 5/0048* (2013.01)

(58) Field of Classification Search
CPC ..... H04W 24/10; H04L 5/0048; H04L 5/0023
(Continued)

(56) References Cited

U.S. PATENT DOCUMENTS 11,337,230 B2 * 5/2022 Wu ...................... H04L 5/0091
2012/0327783 A1 12/2012 Moon
2014/0241274 A1 8/2014 Lee

FOREIGN PATENT DOCUMENTS

CN       102835038 A     12/2012
CN       105359426 A      2/2016
(Continued)

OTHER PUBLICATIONS

ISR received in application No. PCT/CN2017/093596 dated Apr. 26, 2018.
(Continued)

*Primary Examiner* — Maharishi V Khirodhar

(57) ABSTRACT

The present disclosure provides a method and a device in a UE and a base station for wireless communication. The UE receives a first signaling and a second signaling, and then operates a first radio signal. Herein, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the operating action is receiving, or the operating action is transmitting. When the UE is scheduled to transmit or measure a plurality of reference signals, the above method can be employed to avoid possible misunderstanding or confusion resulted from citation of one reference signal.

20 Claims, 13 Drawing Sheets

Related U.S. Application Data continuation of application No. PCT/CN2017/093596, filed on Jul. 20, 2017.

(51) Int. Cl.
*H04W 72/12* (2023.01)
*H04W 76/00* (2018.01)
*H04W 88/08* (2009.01)

(58) Field of Classification Search
USPC .......................................... 370/329
See application file for complete search history.

(56) References Cited

FOREIGN PATENT DOCUMENTS

| | | |
|---|---|---|
| CN | 106455066 A | 2/2017 |
| CN | 106455092 A | 2/2017 |
| CN | 106851826 A | 6/2017 |
| WO | 2014107088 A1 | 7/2014 |
| WO | 2016204546 A1 | 12/2016 |
| WO | 2017028902 A1 | 2/2017 |

OTHER PUBLICATIONS

Notification to Grant Patent Right for Invention of Chinses patent application No. CN201780092472.6 dated Oct. 28, 2022.
First Office Action of Chinses patent application No. CN201780092472.6 dated Jun. 8, 2022.
First Search Report of Chinses patent application No. CN201780092472.6 dated Jun. 1, 2022.
Alcatel-Lucent, Philips Dedicated Reference Signals for Precoding in E-UTRA Downlink 3GPP TSG-RAN WG1 #49 R1-072402 May 2, 2007.
Catt, RITT Further clarifications of the uplink reference signal requirement for downlink pre-coding in TDD mode 3GPP TSG RAN WG1#45 Meeting R1-061273 May 2, 2006.

* cited by examiner

METHOD AND DEVICE IN UE AND BASE STATION USED FOR WIRELESS COMMUNICATION

CROSS-REFERENCE TO RELATED APPLICATION

This application is a continuation of the U.S. patent application Ser. No. 16/745,350, filed on Jan. 17, 2020, which is a continuation of International Application No. PCT/CN2017/093596, filed Jul. 20, 2017, the full disclosure of which is incorporated herein by reference.

BACKGROUND

Technical Field

The present disclosure relates to methods and devices of transmission of radio signals in wireless communication systems, and in particular to a method and a device of transmitting a radio signal in a wireless communication system that supports multi-antenna transmission.

Related Art

In wireless communication systems, reference signals are an essential means of guaranteeing communication quality. Compared with conventional Long Term Evolution (LTE) system, reference signals in 5G system will have to support more diverse features, such as channel status information (CSI) acquisition and beam scanning. In order to meet different requirements for features and optimize designs, the 5G system not only allows a User Equipment (UE) and a base station to measure reference signals in multiple reference signal resources but also supports various reference signals, including periodic, semi-persistent and aperiodic reference signals.

SUMMARY

The inventors have found through researches that a UE in 5G system needs to avoid any confusion that may arise from the citation of one reference signal resource when required to measure or transmit reference signals in a plurality of reference signal resources, particularly when the system has scheduled aperiodic reference signals repeatedly.

In view of the above problem, the present disclosure provides a solution. It should be noted that the embodiments of a UE in the present disclosure and the characteristics in the embodiments may be applied to a base station if no conflict is incurred, and vice versa. The embodiments of the present disclosure and the characteristics in the embodiments may be mutually combined if no conflict is incurred.

The present disclosure provides a method in a UE for wireless communication, comprising:
receiving a first signaling;
receiving a second signaling; and
operating a first radio signal;
herein, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the operating is receiving, or the operating is transmitting.

In one embodiment, an advantage of the above method is that the first signaling can be used for scheduling a reference signal, and then identifying the scheduled reference signal with the first field, while the second signaling can indicate with the second field whether the first radio signal is related to the reference signal scheduled by the first signaling.

In one embodiment, another advantage of the above method is that when the UE is scheduled to transmit or measure a plurality of reference signals, possible misunderstanding of the reference signal(s) related to the first radio signal can be avoided.

In one embodiment, the first signaling is a physical layer signaling.

In one embodiment, the second signaling is a physical layer signaling.

In one embodiment, the first signaling is a dynamic signaling.

In one embodiment, the second signaling is a dynamic signaling.

In one embodiment, the first signaling and the second signaling are physical layer signalings, respectively.

In one embodiment, the first signaling and the second signaling are dynamic signalings, respectively.

In one embodiment, the first field and the second field are respectively composed of a positive integer number of bits.

In one embodiment, a number of bits comprised in the first field is the same as a number of bits comprised in the second field.

In one embodiment, when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one embodiment, the first signaling is a last physical layer signaling received before the second signaling which comprises the first field.

In one embodiment, the first signaling is a last physical layer signaling received before the second signaling which may be used for determining the first radio signal.

In one embodiment, the physical layer signaling is DownLink Control Information (DCI).

In one embodiment, the first signaling is a dynamic signaling used for UpLink Grant.

In one embodiment, the first signaling is a dynamic signaling used for DownLink Grant.

In one embodiment, the second signaling is a dynamic signaling used for UpLink Grant, the operating is transmitting.

In one embodiment, the second signaling is a dynamic signaling used for DownLink Grant, the operating is receiving.

In one embodiment, the first-type scheduling information includes at least one of occupied time domain resources, occupied frequency domain resources, a Modulation and Coding Scheme (MCS), a Hybrid Automatic Repeat reQuest (HARD) process number, a Redundancy Version (RV), a New Data Indicator (NDI), an occupied antenna port, a corresponding transmit beamforming vector, a corresponding receive beamforming vector, a corresponding transmit spatial filtering, or a corresponding receive spatial filtering.

In one embodiment, the phrase that the first radio signal is related to the first signaling means that at least one of an antenna port occupied by the first radio signal, a transmit beamforming vector corresponding to the first radio signal, a receive beamforming vector corresponding to the first radio signal, a transmit spatial filtering corresponding to the first radio signal or a receive spatial filtering corresponding to the first radio signal is related to the first signaling.

In one embodiment, the phrase that the first radio signal is related to the first signaling means that the first signaling is used for determining at least one of an antenna port occupied by the first radio signal, a transmit beamforming vector corresponding to the first radio signal, a receive beamforming vector corresponding to the first radio signal, a transmit spatial filtering corresponding to the first radio signal or a receive spatial filtering corresponding to the first radio signal.

In one embodiment, the phrase that the first radio signal is related to the first signaling means that time-frequency resources occupied by the first radio signal are related to the first signaling.

In one embodiment, the phrase that the first radio signal is related to the first signaling means that the first signaling is used for determining time-frequency resources occupied by the first radio signal.

In one embodiment, the first signaling is transmitted on a downlink physical layer control channel (i.e., a downlink channel only capable of carrying a physical layer signaling).

In one embodiment, the second signaling is transmitted on a downlink physical layer control channel (i.e., a downlink channel only capable of carrying a physical layer signaling).

In one embodiment, the downlink physical layer control channel is a Physical DownlinkControl CHannel (PDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a NarrowBand PDCCH (NB-PDCCH).

In one embodiment, the first signaling is a Medium Access Control layer Control Element (MAC CE) signaling.

In one embodiment, the first signaling is a higher layer signaling.

In one embodiment, the first signaling is a Radio Resource Control (RRC) signaling.

In one embodiment, the first signaling is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a NewRadio PDSCH (NR-PDSCH).

In one embodiment, the downlink physical layer data channel is a NarrowBand PDSCH (NB-PDSCH).

In one embodiment, the first radio signal is transmitted on an uplink physical layer data channel (i.e., an uplink channel capable of carrying physical layer data), the operating is transmitting.

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

In one embodiment, the first radio signal is transmitting on a downlink physical layer data channel (i.e., a downlink channel capable of carrying physical layer data), the operating is receiving.

In one embodiment, the downlink physical layer data channel is a PDSCH.

In one embodiment, the downlink physical layer data channel is an sPDSCH.

In one embodiment, the downlink physical layer data channel is an NR-PDSCH.

In one embodiment, the downlink physical layer data channel is an NB-PDSCH.

Specifically, according to one aspect of the present disclosure, wherein when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

Specifically, according to one aspect of the present disclosure, comprising:
   transmitting a first reference signal;
   herein, the first field of the first signaling and the second field of the second signaling are jointly used for determining that the first radio signal is related to the first signaling, the first signaling is used for determining second-type scheduling information of the first reference signal, the first reference signal comprises P first sub-signal(s), the P first sub-signal(s) is(are) transmitted respectively by P first-type antenna port(s), the first radio signal comprises K radio sub-signal(s), the K radio sub-signal(s) is(are) transmitted respectively by K second-type antenna port(s), multi-antenna related processing(s) of K first sub-signal(s) is(are) respectively used for determining multi-antenna related processing(s) of the K radio sub-signal(s), the K first sub-signal(s) is(are) a subset of the P first sub-signal(s), P is a positive integer, K is a positive integer no greater than the P.

In one embodiment, an advantage of the above method is that multi-antenna related processing of an uplink reference signal can be utilized to optimize multi-antenna processing of uplink or downlink data, thus improving data transmission quality.

In one embodiment, another advantage of the above method is that when the operating is transmitting, the reciprocity between uplink and downlink channels can be employed to reduce the overhead for reference signals and signaling.

In one embodiment, the second-type scheduling information includes at least one of occupied time domain resources, occupied frequency domain resources, occupied code domain resources, cyclic shift, an Orthogonal Cover Code (OCC), an occupied antenna port, a corresponding transmit beamforming vector, a corresponding receive beamforming vector, a corresponding transmit spatial filtering or a corresponding receive spatial filtering.

In one embodiment, the first signaling is used for triggering transmission of the first reference signal.

In one embodiment, the second signaling is used for determining the K first sub-signal(s) out of the P first sub-signal(s).

In one embodiment, the second signaling indicates an index of each of the K first sub-signal(s) in the P first sub-signal(s).

In one embodiment, the second signaling comprises a third field, the third field comprises at least one of an SRS Resource Indicator (SRI), a Transmitted Rank Indicator (TRI), a Rank Indicator (RI), a Precoder Matrix Indicator (PMI), or a Transmitted Precoding Matrix Indicator (TPMI), the third field of the second signaling is used for determining the K first sub-signal(s) out of the P first sub-signal(s).

In one embodiment, the third field comprises an SRI.

In one embodiment, the third field comprises a TRI.

In one embodiment, the third field comprises an RI.

In one embodiment, the third field comprises a TRI and an SRI.

In one embodiment, the third field comprises an RI and an SRI.

In one embodiment, the first reference signal is a Sounding Reference Signal (SRS).

In one embodiment, a value of the first field of the first signaling is equal to a value of the second field of the second signaling.

In one embodiment, a measurement on the first reference signal is used for determining the K first sub-signal(s) out of the P first sub-signal(s).

In one embodiment, measurement(s) on the P first sub-signal(s) is(are) respectively used for determining P receiving quality(qualities).

In one embodiment, a receiving quality of any of the K first sub-signal(s) is greater than a receiving quality of any of the P first sub-signals not belonging to the K first sub-signal(s).

In one embodiment, any of the P receiving quality(qualities) is a Reference Signal Received Power (RSRP).

In one embodiment, any of the P receiving quality(qualities) is a Reference Signal Received Quality (RSRQ).

In one embodiment, any of the P receiving quality(qualities) is a Channel Quality Indicator (CQI).

In one embodiment, P first beamforming vector(s) respectively corresponds(correspond) to the P first sub-signal(s), the P first beamforming vector(s) respectively belongs(belong) to a first beamforming vector set, the first beamforming vector set comprises a positive integer number of beamforming vector(s). For any given first sub-signal of the P first sub-signal(s), a corresponding first beamforming vector is a given first beamforming vector. A receiving quality obtained by a target receiver of the first reference signal when receiving the given first sub-signal employing the given first beamforming vector is higher than a receiving quality obtained by the target receiver of the first reference signal when receiving the given first sub-signal employing any beamforming vector of the first beamforming vector set other than the given first beamforming vector.

In one embodiment, the P receiving quality(qualities) is(are) receiving quality(qualities) obtained when the target receiver of the first reference signal receives the P first sub-signal(s) respectively employing the P first beamforming vector(s).

In one embodiment, K first beamforming vector(s) is(are) first beamforming vector(s) respectively corresponding to the K first sub-signal(s) out of the P first beamforming vector(s).

In one embodiment, a receiving quality obtained by a target receiver of the first reference signal when employing any of the K first beamforming vector(s) to receive a corresponding first sub-signal is greater than a receiving quality obtained by the target receiver of the first reference signal when employing any of the P first beamforming vectors not belonging to the K first beamforming vector(s) to receive a corresponding first sub-signal.

In one embodiment, any given first-type antenna port of the P first-type antenna port(s) is formed by a plurality of antennas through antenna virtualization, mapping coefficients of the plurality of antennas to the given first-type antenna port constitute a beamforming vector, wherein the beamforming vector is a Kronecker product of an analog beamforming vector and a digital beamforming vector.

In one embodiment, any given second-type antenna port of the K second-type antenna port(s) is formed by a plurality of antennas through antenna virtualization, mapping coefficients of the plurality of antennas to the given second-type antenna port constitute a beamforming vector, wherein the beamforming vector is a Kronecker product of an analog beamforming vector and a digital beamforming vector.

In one embodiment, K first-type antenna port(s) is(are) a subset of the P first-type antenna port(s), the K first-type antenna port(s) is(are) respectively used for transmitting the K first sub-signal(s), the K first-type antenna port(s) respectively corresponds(correspond) to the K second-type antenna port(s).

In one embodiment, the phrase that multi-antenna related processing(s) of the K first sub-signal(s) is(are) respectively used for determining multi-antenna related processing(s) of the K radio sub-signal(s) means that multi-antenna related transmission(s) of the K first sub-signal(s) is(are) respectively used for determining multi-antenna related transmission(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that any of the K first-type antenna port(s) is Quasi Co-Located (QCL) with a corresponding second-type antenna port, the operating is transmitting.

In one embodiment, the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same beamforming vector, the operating is transmitting.

In one embodiment, the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same analog beamforming vector, the operating is transmitting.

In one embodiment, the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same analog beamforming vector and a same digital beamforming vector, the operating is transmitting.

In one embodiment, the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same spatial filtering, the operating is transmitting.

In one embodiment, the phrase that multi-antenna related processing(s) of the K first sub-signal(s) is(are) respectively used for determining multi-antenna related processing(s) of the K radio sub-signal(s) means that transmit spatial filtering(s) corresponding to the K first sub-signal(s) is(are) respectively the same as transmit spatial filtering(s) corresponding to the K radio sub-signal(s), the operating is transmitting.

In one embodiment, two antenna ports being QCL means that large-scale properties of a channel experienced by a radio signal transmitted from one antenna port can be used to infer large-scale properties of a channel experienced by a radio signal transmitted from another antenna port. The large-scale properties include one or more of delay spread, Doppler spread, Doppler shift, average gain, average delay, angle of arrival, angle of departure, or spatial correlation.

In one embodiment, two antenna ports being QCL means that the two antenna ports correspond to a same analog beamforming vector.

In one embodiment, two antenna ports being QCL means that the two antenna ports correspond to a same beamforming vector.

In one embodiment, two antenna ports being QCL means that a target receiver of the first reference signal is allowed to receive radio signals respectively transmitted from two antenna ports employing a same beamforming vector.

In one embodiment, two antenna ports being QCL means that a target receiver of the first reference signal is allowed to receive radio signals respectively transmitted from two antenna ports employing a same analog beamforming vector.

In one embodiment, two antenna ports being QCL means that a target receiver of the first reference signal is allowed to receive radio signals respectively transmitted from two antenna ports employing a same spatial filtering.

In one embodiment, the phrase that multi-antenna related processing(s) of the K first sub-signal(s) is(are) respectively used for determining multi-antenna related processing(s) of the K radio sub-signal(s) means that multi-antenna related reception(s) of the K first sub-signal(s) is(are) respectively used for determining multi-antenna related transmission(s) of the K radio sub-signal(s), the operating is receiving.

In one embodiment, the phrase that multi-antenna related processing(s) of the K first sub-signal(s) is(are) respectively used for determining multi-antenna related processing(s) of the K radio sub-signal(s) means that measurement(s) on the K first sub-signal(s) is(are) respectively used for determining the K second-type antenna port(s), the operating is receiving.

In one embodiment, the phrase that multi-antenna related processing(s) of the K first sub-signal(s) is(are) respectively used for determining multi-antenna related processing(s) of the K radio sub-signal(s) means that measurement(s) on the K first sub-signal(s) is(are) respectively used for determining a beamforming vector(s) corresponding to the K second-type antenna port(s), the operating is receiving.

In one embodiment, the phrase that multi-antenna related processing(s) of the K first sub-signal(s) is(are) respectively used for determining multi-antenna related processing(s) of the K radio sub-signal(s) means that measurement(s) on the K first sub-signal(s) is(are) respectively used for determining an analog beamforming vector(s) corresponding to the K second-type antenna port(s), the operating is receiving.

In one embodiment, the phrase that multi-antenna related processing(s) of the K first sub-signal(s) is(are) respectively used for determining multi-antenna related processing(s) of the K radio sub-signal(s) means that the K first beamforming vector(s) is(are) respectively used as beamforming vector(s) corresponding to the K second-type antenna port(s), the operating is receiving.

In one embodiment, the phrase that multi-antenna related processing(s) of the K first sub-signal(s) is(are) respectively used for determining multi-antenna related processing(s) of the K radio sub-signal(s) means that the K first beamforming vector(s) is(are) respectively used as analog beamforming vector(s) corresponding to the K second-type antenna port(s), the operating is receiving.

In one embodiment, the phrase that multi-antenna related processing(s) of the K first sub-signal(s) is(are) respectively used for determining multi-antenna related processing(s) of the K radio sub-signal(s) means that receive spatial filtering(s) corresponding to the K first sub-signal(s) is(are) respectively the same as transmit spatial filtering(s) corresponding to the K radio sub-signal(s), the operating is receiving.

In one embodiment, measurement(s) on the K first sub-signal(s) is(are) used for determining an MCS of the first radio signal, the operating is transmitting.

In one embodiment, receiving quality(qualities) of the K first sub-signal(s) is(are) used for determining an MCS of the first radio signal, the operating is transmitting.

In one embodiment, the phrase that multi-antenna related processing(s) of the K first sub-signal(s) is(are) respectively used for determining multi-antenna related processing(s) of the K radio sub-signal(s) means that multi-antenna related reception(s) of the K first sub-signal(s) is(are) respectively used for determining multi-antenna related reception(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that measurement(s) on the K first sub-signal(s) is(are) respectively used for determining a receive beamforming vector(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that measurement(s) on the K first sub-signal(s) is(are) respectively used for determining a receive analog beamforming vector(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that the K first beamforming vector(s) is(are) respectively used as receive beamforming vector(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that the K first beamforming vector(s) is(are) respectively used as receive analog beamforming vector(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that receive spatial filtering(s) of the K first sub-signal(s) is(are) respectively the same as receive spatial filtering(s) of the K radio sub-signal(s), the operating is transmitting.

In one embodiment, the phrase that multi-antenna related processing(s) of the K first sub-signal(s) is(are) respectively used for determining multi-antenna related processing(s) of the K radio sub-signal(s) means that multi-antenna related transmission(s) of the K first sub-signal(s) is(are) respectively used for determining multi-antenna related reception(s) of the K radio sub-signal(s), the operating is receiving.

In one embodiment, the phrase that multi-antenna related processing(s) of the K first sub-signal(s) is(are) respectively used for determining multi-antenna related processing(s) of the K radio sub-signal(s) means that the K first-type antenna port(s) is(are) respectively used for determining receive beamforming vector(s) of the K radio sub-signal(s), the operating is receiving.

In one embodiment, the phrase that multi-antenna related processing(s) of the K first sub-signal(s) is(are) respectively used for determining multi-antenna related processing(s) of the K radio sub-signal(s) means that the K first-type antenna port(s) is(are) respectively used for determining receive analog beamforming vector(s) of the K radio sub-signal(s), the operating is receiving.

In one embodiment, the phrase that multi-antenna related processing(s) of the K first sub-signal(s) is(are) respectively used for determining multi-antenna related processing(s) of the K radio sub-signal(s) means that beamforming vector(s) corresponding to the K first-type antenna port(s) is(are) respectively used as receive beamforming vector(s) of the K radio sub-signal(s), the operating is receiving.

In one embodiment, the phrase that multi-antenna related processing(s) of the K first sub-signal(s) is(are) respectively used for determining multi-antenna related processing(s) of the K radio sub-signal(s) means that analog beamforming vector(s) corresponding to the K first-type antenna port(s) is(are) respectively used as receive analog beamforming vector(s) of the K radio sub-signal(s), the operating is receiving.

In one embodiment, the phrase that multi-antenna related processing(s) of the K first sub-signal(s) is(are) respectively used for determining multi-antenna related processing(s) of the K radio sub-signal(s) means that transmit spatial filtering(s) corresponding to the K first sub-signal(s) is(are) respectively the same as receive spatial filtering(s) corresponding to the K radio sub-signal(s), the operating is receiving.

In one embodiment, the first reference signal is wideband.

In one embodiment, a system bandwidth is divided into a positive integer number of frequency-domain regions, the first reference signal occurs in all frequency-domain regions within the system bandwidth, any of the positive integer number of frequency-domain regions comprises a positive integer number of consecutive subcarriers.

In one embodiment, any two frequency-domain regions of the positive integer number of frequency-domain regions comprise equal numbers of subcarriers.

In one embodiment, the first reference signal is narrowband.

In one embodiment, the first reference signal occurs only in part of the positive integer number of frequency-domain regions.

In one embodiment, the first reference signal occurs only once in time domain.

In one embodiment, the first reference signal occurs multiple times in time domain.

In one embodiment, time-frequency resources occupied by any two of the P first sub-signals are mutually orthogonal (that is, non-overlapping).

In one embodiment, time domain resources occupied by any two of the P first sub-signals are mutually orthogonal (that is, non-overlapping).

In one embodiment, at least two of the P first sub-signals occupy same time domain resources.

In one embodiment, code domain resources occupied by any two of the P first sub-signals are mutually orthogonal.

In one embodiment, at least two of the P first sub-signals occupy same time-frequency resources.

In one embodiment, the K radio sub-signals occupy same time-frequency resources.

In one embodiment, at least two of the K radio sub-signals occupy orthogonal (non-overlapping) time-frequency resources.

In one embodiment, frequency domain resources occupied by the first radio signal belong to frequency domain resources occupied by the first reference signal.

In one embodiment, frequency domain resources occupied by the first radio signal are a part of frequency domain resources occupied by the first reference signal.

In one embodiment, the first radio signal and the first reference signal occupy same frequency domain resources.

In one embodiment, the K is less than the P.

In one embodiment, the K is equal to the P.

In one embodiment, the P is equal to 1.

In one embodiment, the P is greater than 1.

Specifically, according to one aspect of the present disclosure, comprising:

receiving a second reference signal;

herein, the first field of the first signaling and the second field of the second signaling are jointly used for determining that the first radio signal is related to the first signaling, the first signaling is used for determining third-type scheduling information of the second reference signal, the second reference signal comprises Q second sub-signal(s), the Q second sub-signal(s) is(are) respectively transmitted by Q third-type antenna port(s), the first radio signal comprises K radio sub-signal(s), the K radio sub-signal(s) is(are) transmitted respectively by K second-type antenna port(s), multi-antenna related processing(s) of K second sub-signal(s) is(are) respectively used for determining multi-antenna related processing(s) of the K radio sub-signal(s), the K second sub-signal(s) is(are) a subset of the Q second sub-signal(s), Q is a positive integer, K is a positive integer no greater than the Q.

In one embodiment, an advantage of the above method is that multi-antenna related processing of a downlink reference signal can be utilized to optimize multi-antenna related processing of uplink or downlink data, thereby improving data transmission quality.

In one embodiment, another advantage of the above method is that when the operating is receiving, the reciprocity between uplink and downlink channels may be employed to reduce the overhead for reference signals and signaling.

In one embodiment, the third-type scheduling information includes at least one of occupied time domain resources, occupied frequency domain resources, occupied code domain resources, cyclic shift, an OCC, an occupied antenna port, a corresponding transmit beamforming vector, a corresponding receive beamforming vector, a corresponding transmit spatial filtering or a corresponding receive spatial filtering.

In one embodiment, the first signaling is used for triggering a measurement on the second reference signal.

In one embodiment, the second signaling is used for determining the K second sub-signal(s) out of the Q second sub-signal(s).

In one embodiment, the second signaling indicates an index of each of the K second sub-signal(s) in the Q second sub-signal(s).

In one embodiment, the second signaling comprises a fourth field, the fourth field comprises at least one of a TRI, an RI, a CRI, a PMI or a TPMI, and the fourth field of the second signaling is used for determining the K second sub-signal(s) out of the Q second sub-signal(s).

In one embodiment, the fourth field comprises a TRI.

In one embodiment, the fourth field comprises a CRI.

In one embodiment, the fourth field comprises an RI.

In one embodiment, the fourth field comprises a TRI and a CRI.

In one embodiment, the fourth field comprises an RI and a CRI.

In one embodiment, the second reference signal includes at least one of Channel State Information-Reference Signal (CSI-RS), DeModulation Reference Signals (DMRS), fine-time/frequency Tracking Reference Signals (TRS), Phase error Tracking Reference Signals (PTRS), Primary Synchronization Signal (PSS), Secondary Synchronization Signal (SSS), Primary Sidelink Synchronization Signal (PSSS), or Secondary Sidelink Synchronization Signal (SSSS).

In one embodiment, a value of the first field of the first signaling is equal to a value of the second field of the second signaling.

In one embodiment, a measurement on the second reference signal is used for determining the K second sub-signal(s) out of the Q second sub-signal(s).

In one embodiment, measurement(s) on the Q second sub-signal(s) is(are) respectively used for determining Q receiving quality(qualities).

In one embodiment, a receiving quality of any of the K second sub-signal(s) is greater than a receiving quality of any of the Q second sub-signals not belonging to the K second sub-signal(s).

In one embodiment, any of the Q receiving quality (qualities) is an RSRP.

In one embodiment, any of the Q receiving quality (qualities) is an RSRQ.

In one embodiment, any of the Q receiving quality (qualities) is a CQI.

In one embodiment, Q second beamforming vector(s) respectively corresponds(correspond) to the Q second sub-signal(s), the Q second beamforming vector(s) respectively belongs(belong) to a second beamforming vector set, the second beamforming vector set comprises a positive integer number of beamforming vector(s). For any given second sub-signal of the Q second sub-signal(s), a corresponding second beamforming vector is a given second beamforming vector. A receiving quality obtained by the UE when receiving the given second sub-signal employing the given second beamforming vector is higher than a receiving quality obtained by the UE when receiving the given second sub-signal employing any beamforming vector of the second beamforming vector set other than the given second beamforming vector.

In one embodiment, the Q receiving quality(qualities) is(are) receiving quality(qualities) obtained when the UE receives the Q second sub-signal(s) respectively employing the Q second beamforming vector(s).

In one embodiment, K second beamforming vector(s) is(are) second beamforming vector(s) respectively corresponding to the K second sub-signal(s) out of the Q second beamforming vector(s).

In one embodiment, a receiving quality obtained by the UE when employing any of the K second beamforming vector(s) to receive a corresponding second sub-signal is greater than a receiving quality obtained by the UE when employing any of the Q second beamforming vectors not belonging to the K second beamforming vector(s) to receive a corresponding second sub-signal.

In one embodiment, any given third-type antenna port of the Q third-type antenna port(s) is formed by a plurality of antennas through antenna virtualization, mapping coefficients of the plurality of antennas to the given third-type antenna port constitute a beamforming vector, wherein the beamforming vector is a Kronecker product of an analog beamforming vector and a digital beamforming vector.

In one embodiment, any given second-type antenna port of the K second-type antenna port(s) is formed by a plurality of antennas through antenna virtualization, mapping coefficients of the plurality of antennas to the given second-type antenna port constitute a beamforming vector, wherein the beamforming vector is a Kronecker product of an analog beamforming vector and a digital beamforming vector.

In one embodiment, K third-type antenna port(s) is(are) a subset of the Q third-type antenna port(s), the K third-type antenna port(s) is(are) respectively used for transmitting the K second sub-signal(s), the K third-type antenna port(s) respectively corresponds(correspond) to the K second-type antenna port(s).

In one embodiment, the phrase that multi-antenna related processing(s) of the K second sub-signal(s) is(are) respectively used for determining multi-antenna related processing(s) of the K radio sub-signal(s) means that multi-antenna related transmission(s) of the K second sub-signal(s) is(are) respectively used for determining multi-antenna related transmission(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that any of the K third-type antenna port(s) is QCL with a corresponding second-type antenna port, the operating is receiving.

In one embodiment, the phrase that multi-antenna related processing(s) of the K second sub-signal(s) is(are) respectively used for determining multi-antenna related processing(s) of the K radio sub-signal(s) means that any of the K second-type antenna port(s) and a corresponding third-type antenna port correspond to a same beamforming vector, the operating is receiving.

In one embodiment, the phrase that multi-antenna related processing(s) of the K second sub-signal(s) is(are) respectively used for determining multi-antenna related processing(s) of the K radio sub-signal(s) means that any of the K second-type antenna port(s) and a corresponding third-type antenna port correspond to a same analog beamforming vector, the operating is receiving.

In one embodiment, the phrase that multi-antenna related processing(s) of the K second sub-signal(s) is(are) respectively used for determining multi-antenna related processing(s) of the K radio sub-signal(s) means that any of the K second-type antenna port(s) and a corresponding third-type antenna port correspond to a same analog beamforming vector and a same digital beamforming vector, the operating is receiving.

In one embodiment, the phrase that multi-antenna related processing(s) of the K second sub-signal(s) is(are) respectively used for determining multi-antenna related processing(s) of the K radio sub-signal(s) means that any of the K second-type antenna port(s) and a corresponding third-type antenna port correspond to a same spatial filtering, the operating is receiving.

In one embodiment, the phrase that multi-antenna related processing(s) of the K second sub-signal(s) is(are) respectively used for determining multi-antenna related processing(s) of the K radio sub-signal(s) means that transmit spatial filtering(s) corresponding to the K second sub-signal(s) is(are) respectively the same as transmit spatial filtering(s) corresponding to the K radio sub-signal(s), the operating is receiving.

In one embodiment, two antenna ports being QCL means that the UE is allowed to receive radio signals respectively transmitted from two antenna ports employing a same beamforming vector.

In one embodiment, two antenna ports being QCL means that the UE is allowed to receive radio signals respectively transmitted from two antenna ports employing a same analog beamforming vector.

In one embodiment, two antenna ports being QCL means that the UE is allowed to receive radio signals respectively transmitted from two antenna ports employing a same spatial filtering.

In one embodiment, the phrase that multi-antenna related processing(s) of the K second sub-signal(s) is(are) respectively used for determining multi-antenna related processing(s) of the K radio sub-signal(s) means that multi-antenna related reception(s) of the K second sub-signal(s) is(are) respectively used for determining multi-antenna related transmission(s) of the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that measurement(s) on the K second sub-signal(s) is(are) respectively used for determining the K second-type antenna port(s), the operating is transmitting.

In one embodiment, the phrase that multi-antenna related processing(s) of the K second sub-signal(s) is(are) respectively used for determining multi-antenna related processing(s) of the K radio sub-signal(s) means that measurement(s) on the K second sub-signal(s) is(are) respectively used for determining a beamforming vector(s) corresponding to the K second-type antenna port(s), the operating is transmitting.

In one embodiment, the phrase that multi-antenna related processing(s) of the K second sub-signal(s) is(are) respectively used for determining multi-antenna related processing(s) of the K radio sub-signal(s) means that measurement(s) on the K second sub-signal(s) is(are) respectively used for determining an analog beamforming vector(s) corresponding to the K second-type antenna port(s), the operating is transmitting.

In one embodiment, the phrase that multi-antenna related processing(s) of the K second sub-signal(s) is(are) respectively used for determining multi-antenna related processing(s) of the K radio sub-signal(s) means that the K second beamforming vector(s) is(are) respectively used as beamforming vector(s) corresponding to the K second-type antenna port(s), the operating is transmitting.

In one embodiment, the phrase that multi-antenna related processing(s) of the K second sub-signal(s) is(are) respectively used for determining multi-antenna related processing(s) of the K radio sub-signal(s) means that the K second beamforming vector(s) is(are) respectively used as analog beamforming vector(s) corresponding to the K second-type antenna port(s), the operating is transmitting.

In one embodiment, the phrase that multi-antenna related processing(s) of the K second sub-signal(s) is(are) respectively used for determining multi-antenna related processing(s) of the K radio sub-signal(s) means that receive spatial filtering(s) corresponding to the K second sub-signal(s) is(are) respectively the same as transmit spatial filtering(s) corresponding to the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that multi-antenna related reception(s) of the K second sub-signal(s) is(are) respectively used for determining multi-antenna related reception(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that measurement(s) on the K second sub-signal(s) is(are) respectively used for determining a receive beamforming vector(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that measurement(s) on the K second sub-signal(s) is(are) respectively used for determining a receive analog beamforming vector(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that the K second beamforming vector(s) is(are) respectively used as receive beamforming vector(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that the K second beamforming vector(s) is(are) respectively used as receive analog beamforming vector(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that receive spatial filtering(s) of the K second sub-signal(s) is(are) respectively the same as receive spatial filtering(s) of the K radio sub-signal(s), the operating is receiving.

In one embodiment, the phrase that multi-antenna related processing(s) of the K second sub-signal(s) is(are) respectively used for determining multi-antenna related processing(s) of the K radio sub-signal(s) means that multi-antenna related transmission(s) of the K second sub-signal(s) is(are) respectively used for determining multi-antenna related reception(s) of the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that the K third-type antenna port(s) is(are) respectively used for determining a receive beamforming vector(s) of the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that the K third-type antenna port(s) is(are) respectively used for determining a receive analog beamforming vector(s) of the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that beamforming vector(s) corresponding to the K third-type antenna port(s) is(are) respectively used as receive beamforming vector(s) of the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that analog beamforming vector(s) corresponding to the K third-type antenna port(s) is(are) respectively used as receive analog beamforming vector(s) of the K radio sub-signal(s), the operating is transmitting.

In one embodiment, the phrase that multi-antenna related processing(s) of the K second sub-signal(s) is(are) respectively used for determining multi-antenna related processing(s) of the K radio sub-signal(s) means that transmit spatial filtering(s) corresponding to the K second sub-signal(s) is(are) respectively the same as receive spatial filtering(s) corresponding to the K radio sub-signal(s), the operating is transmitting.

In one embodiment, the second reference signal is wideband.

In one embodiment, a system bandwidth is divided into a positive integer number of frequency-domain regions, the second reference signal occurs in all frequency-domain regions within the system bandwidth, any of the positive integer number of frequency-domain regions comprises a positive integer number of consecutive subcarriers.

In one embodiment, any two of the positive integer number of frequency-domain regions comprise equal numbers of subcarriers.

In one embodiment, the second reference signal is narrowband.

In one embodiment, the second reference signal occurs only once in time domain.

In one embodiment, the second reference signal occurs multiple times in time domain.

In one embodiment, the second reference signal occurs only in part of the positive integer number of frequency-domain regions.

In one embodiment, time-frequency resources occupied by any two of the Q second sub-signals are mutually orthogonal (that is, non-overlapping).

In one embodiment, time domain resources occupied by any two of the Q second sub-signals are mutually orthogonal (that is, non-overlapping).

In one embodiment, at least two of the Q second sub-signals occupy same time domain resources.

In one embodiment, code domain resources occupied by any two of the Q second sub-signals are mutually orthogonal.

In one embodiment, at least two of the Q second sub-signals occupy same time-frequency resources.

In one embodiment, the K is less than the Q.

In one embodiment, the K is equal to the Q.

In one embodiment, the Q is greater than 1.

Specifically, according to one aspect of the present disclosure, comprising:
transmitting uplink information;
herein, the uplink information is used for determining K1 second sub-signal(s), the K1 second sub-signal(s) is(are) a subset of the Q second sub-signal(s), the K second sub-signal(s) is(are) a subset of the K1 second sub-signal(s), K1 is a positive integer no greater than the Q and no less than the K.

In one embodiment, a measurement on the second reference signal is used for determining the K1 second sub-signal(s).

In one embodiment, a receiving quality of any of the K1 second sub-signal(s) is greater than a receiving quality of any of the Q second sub-signals not belonging to the K1 second sub-signal(s).

In one embodiment, the K1 is equal to the K.

In one embodiment, the K1 is greater than the K.

In one embodiment, the K1 is less than the Q.

In one embodiment, the uplink information indicates an index of each of the K1 second sub-signal(s) in the Q second sub-signals.

In one embodiment, the uplink information is used for determining K1 receiving quality(qualities), the K1 receiving quality(qualities) is(are) receiving quality(qualities) respectively corresponding to the K1 second sub-signal(s) out of the Q receiving quality(qualities).

In one embodiment, K1 second beamforming vector(s) is(are) second beamforming vector(s) respectively corresponding to the K1 second sub-signal(s) out of the Q second beamforming vector(s).

In one embodiment, a receiving quality obtained by the UE when employing any of the K1 second beamforming vector(s) to receive a corresponding second sub-signal is greater than a receiving quality obtained by the UE when employing any of the Q second beamforming vectors not belonging to the K1 second beamforming vector(s) to receive a corresponding second sub-signal.

In one embodiment, the uplink information indicates the K1 receiving quality(qualities).

In one embodiment, the uplink information includes Uplink Control Information (UCI).

In one embodiment, the uplink information includes one or more of CSI, CRI, RSRP, RSRQ, CQI or PMI.

In one embodiment, the uplink information is carried by a physical layer signaling.

In one embodiment, the uplink information is transmitted on an uplink physical layer control channel (i.e., an uplink channel only capable of carrying a physical layer signaling).

In one embodiment, the uplink physical layer control channel is a Physical Uplink Control CHannel (PUCCH).

In one embodiment, the uplink physical layer control channel is a short PUCCH (sPUCCH).

In one embodiment, the uplink physical layer control channel is a New Radio PUCCH (NR-PUCCH).

In one embodiment, the uplink physical layer control channel is a Narrow Band PUCCH (NB-PUCCH).

In one embodiment, the uplink information is transmitted on an uplink physical layer data channel (i.e., an uplink channel capable of carrying physical layer data).

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

Specifically, according to one aspect of the present disclosure, comprising:
receiving first downlink information;
herein, the first downlink information is used for determining T1 piece(s) of second-type scheduling information, the second-type scheduling information of the first reference signal is one of the T1 piece(s) of second-type scheduling information, T1 is a positive integer.

In one embodiment, the first signaling is used for determining second-type scheduling information of the first reference signal out of the T1 piece(s) of second-type scheduling information.

In one embodiment, the first signaling indicates an index of second-type scheduling information of the first reference signal in the T1 piece(s) of second-type scheduling information.

In one embodiment, the first downlink information is carried by a higher layer signaling.

In one embodiment, the first downlink information is carried by an RRC signaling.

In one embodiment, the first downlink information is carried by a MAC CE signaling.

In one embodiment, the first downlink information is transmitted on a downlink physical layer data channel (i.e., a downlink channel capable of carrying physical layer data).

In one embodiment, the downlink physical layer data channel is a PDSCH.

In one embodiment, the downlink physical layer data channel is an sPDSCH.

In one embodiment, the downlink physical layer data channel is an NR-PDSCH.

In one embodiment, the downlink physical layer data channel is an NB-PDSCH.

Specifically, according to one aspect of the present disclosure, comprising:
receiving second downlink information;
herein, the second downlink information is used for determining T2 piece(s) of third-type scheduling information, the third-type scheduling information of the second reference signal is one of the T2 piece(s) of third-type scheduling information, T2 is a positive integer.

In one embodiment, the first signaling is used for determining third-type scheduling information of the second reference signal out of the T2 piece(s) of third-type scheduling information.

In one embodiment, the first signaling indicates an index of third-type scheduling information of the second reference signal in the T2 piece(s) of third-type scheduling information.

In one embodiment, the second downlink information is carried by a higher layer signaling.

In one embodiment, the second downlink information is carried by an RRC signaling.

In one embodiment, the second downlink information is carried by a MAC CE signaling.

In one embodiment, the second downlink information is transmitted on a downlink physical layer data channel (i.e., a downlink channel capable of carrying physical layer data).

In one embodiment, the downlink physical layer data channel is a PDSCH.

In one embodiment, the downlink physical layer data channel is an sPDSCH.

In one embodiment, the downlink physical layer data channel is an NR-PDSCH.

In one embodiment, the downlink physical layer data channel is an NB-PDSCH.

Specifically, according to one aspect of the present disclosure, wherein the first field of the first signaling is used for identifying the first reference signal.

Specifically, according to one aspect of the present disclosure, wherein the first field of the first signaling is used for identifying the second reference signal.

Specifically, according to one aspect of the present disclosure, wherein the first signaling is used for determining at least one of fourth-type scheduling information of the first radio signal or fifth-type scheduling information of the second signaling.

In one embodiment, the fourth-type scheduling information belongs to a target information set, the first-type scheduling information belongs to the target information set, the target information set comprises a positive integer number of piece(s) of information; any piece of information in the target information set is and can only be one of the first-type scheduling information or the fourth-type scheduling information, the target information set comprises at least two of occupied time domain resources, occupied frequency domain resources, an MCS, a HARQ process number, an RV, an NDI, an occupied antenna port, a corresponding transmit beamforming vector, a corresponding receive beamforming vector, a corresponding transmit spatial filtering, or a corresponding receive spatial filtering.

In one embodiment, the fifth-type scheduling information includes at least one of occupied time domain resources, occupied frequency domain resources, a number of information bits comprised, an identifying integer, an occupied antenna port, a corresponding transmit beamforming vector, a corresponding receive beamforming vector, a corresponding transmit spatial filtering, or a corresponding receive spatial filtering.

In one embodiment, the identifying integer is a Radio Network Temporary Identifier (RNTI).

In one embodiment, the identifying integer is used for determining at least one of probably occupied Resource Element (RE) set, Cyclic Redundancy Check (CRC) or DMRS of a physical layer signaling corresponding to the fifth-type scheduling information, the RE set comprises a positive integer number of RE(s).

In one embodiment, the first signaling explicitly indicates fourth-type scheduling information of the first radio signal.

In one embodiment, the first signaling explicitly indicates fifth-type scheduling information of the second signaling.

In one embodiment, the first signaling explicitly indicates the fourth-type scheduling information of the first radio signal and the fifth-type scheduling information of the second signaling.

In one embodiment, the first signaling implicitly indicates the fourth-type scheduling information of the first radio signal.

In one embodiment, the first signaling implicitly indicates the fifth-type scheduling information of the second signaling.

In one embodiment, the first signaling implicitly indicates the fourth-type scheduling information and the fifth-type scheduling information of the second signaling.

The present disclosure provides a method in a base station for wireless communication, comprising:
transmitting a first signaling;
transmitting a second signaling; and
executing a first radio signal;
herein, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the executing is transmitting, or the executing is receiving.

In one embodiment, the first signaling and the second signaling are physical layer signalings, respectively.

In one embodiment, the first signaling and the second signaling are dynamic signalings, respectively.

In one embodiment, the first field and the second field are respectively composed of a positive integer number of bits.

In one embodiment, according to one aspect of the present disclosure, wherein when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

Specifically, according to one aspect of the present disclosure, comprising:
receiving a first reference signal;
herein, the first field of the first signaling and the second field of the second signaling are jointly used for determining that the first radio signal is related to the first signaling; the first signaling is used for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s); multi-antenna related processing(s) of K first sub-signal(s) is(are) respectively used for determining multi-antenna related processing(s) of the K radio sub-signal(s), the K first sub-signal(s) is(are) a subset of the P first sub-signal(s), P is a positive integer, K is a positive integer no greater than the P.

In one embodiment, the second signaling is used for determining the K first sub-signal(s) out of the P first sub-signal(s).

In one embodiment, the first reference signal is a Sounding Reference Signal (SRS).

In one embodiment, the phrase that multi-antenna related processing(s) of the K first sub-signal(s) is(are) respectively used for determining multi-antenna related processing(s) of the K radio sub-signal(s) means that multi-antenna related transmission(s) of the K first sub-signal(s) is(are) respectively used for determining multi-antenna related transmission(s) of the K radio sub-signal(s), the executing is receiving.

In one embodiment, the phrase that multi-antenna related processing(s) of the K first sub-signal(s) is(are) respectively used for determining multi-antenna related processing(s) of the K radio sub-signal(s) means that multi-antenna related reception(s) of the K first sub-signal(s) is(are) respectively used for determining multi-antenna related transmission(s) of the K radio sub-signal(s), the executing is transmitting.

In one embodiment, the phrase that multi-antenna related processing(s) of the K first sub-signal(s) is(are) respectively used for determining multi-antenna related processing(s) of the K radio sub-signal(s) means that multi-antenna related reception(s) of the K first sub-signal(s) is(are) respectively used for determining multi-antenna related reception(s) of the K radio sub-signal(s), the executing is receiving.

In one embodiment, the phrase that multi-antenna related processing(s) of the K first sub-signal(s) is(are) respectively used for determining multi-antenna related processing(s) of the K radio sub-signal(s) means that multi-antenna related transmission(s) of the K first sub-signal(s) is(are) respectively used for determining multi-antenna related reception(s) of the K radio sub-signal(s), the executing is transmitting.

Specifically, according to one aspect of the present disclosure, comprising:
transmitting a second reference signal;
herein, the first field of the first signaling and the second field of the second signaling are jointly used for determining that the first radio signal is related to the first signaling; the first signaling is used for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) transmitted respectively by K second-type antenna port(s); multi-antenna related processing(s) of K second sub-signal(s) is(are) respectively used for determining multi-antenna related processing(s) of the K radio sub-signal(s), the K second sub-signal(s) is(are) a subset of the Q second sub-signal(s); Q is a positive integer, K is a positive integer no greater than the Q.

In one embodiment, the second signaling is used for determining the K second sub-signal(s) out of the Q second sub-signal(s).

In one embodiment, the second reference signal includes Channel State Information-Reference Signal (CSI-RS).

In one embodiment, the phrase that multi-antenna related processing(s) of the K second sub-signal(s) is(are) respectively used for determining multi-antenna related processing(s) of the K radio sub-signal(s) means that multi-antenna related transmission(s) of the K second sub-signal(s) is(are) respectively used for determining multi-antenna related transmission(s) of the K radio sub-signal(s), the executing is transmitting.

In one embodiment, the phrase that multi-antenna related processing(s) of the K second sub-signal(s) is(are) respectively used for determining multi-antenna related processing(s) of the K radio sub-signal(s) means that multi-antenna related reception(s) of the K second sub-signal(s) is(are) respectively used for determining multi-antenna related transmission(s) of the K radio sub-signal(s), the executing is receiving.

In one embodiment, the phrase that multi-antenna related processing(s) of the K second sub-signal(s) is(are) respectively used for determining multi-antenna related processing(s) of the K radio sub-signal(s) means that multi-antenna related reception(s) of the K second sub-signal(s) is(are) respectively used for determining multi-antenna related reception(s) of the K radio sub-signal(s), the executing is transmitting.

In one embodiment, the phrase that multi-antenna related processing(s) of the K second sub-signal(s) is(are) respectively used for determining multi-antenna related processing(s) of the K radio sub-signal(s) means that multi-antenna related transmission(s) of the K second sub-signal(s) is(are) respectively used for determining multi-antenna related reception(s) of the K radio sub-signal(s), the executing is receiving.

Specifically, according to one aspect of the present disclosure, comprising:
receiving uplink information;
herein, the uplink information is used for determining K1 second sub-signal(s), the K1 second sub-signal(s) is(are) a subset of the Q second sub-signal(s), the K second sub-signal(s) is(are) a subset of the K1 second sub-signal(s), K1 is a positive integer no greater than the Q and no less than the K.

In one embodiment, the uplink information includes Uplink Control Information (UCI).

Specifically, according to one aspect of the present disclosure, comprising:

transmitting first downlink information;

herein, the first downlink information is used for determining T1 piece(s) of second-type scheduling information, the second-type scheduling information of the first reference signal is one of the T1 piece(s) of second-type scheduling information, T1 is a positive integer.

Specifically, according to one aspect of the present disclosure, comprising:

transmitting second downlink information;

herein, the second downlink information is used for determining T2 piece(s) of third-type scheduling information, the third-type scheduling information of the second reference signal is one of the T2 piece(s) of third-type scheduling information, T2 is a positive integer.

Specifically, according to one aspect of the present disclosure, wherein the first field of the first signaling is used for identifying the first reference signal.

Specifically, according to one aspect of the present disclosure, wherein the first field of the first signaling is used for identifying the second reference signal.

Specifically, according to one aspect of the present disclosure, wherein the first signaling is used for determining at least one of fourth-type scheduling information of the first radio signal or fifth-type scheduling information of the second signaling.

The present disclosure provides a UE for wireless communication, comprising:

a first receiver, receiving a first signaling and a second signaling; and a first processor, operating a first radio signal;

herein, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the operating is receiving, or the operating is transmitting.

In one embodiment, the above UE for wireless communication is characterized in that when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one embodiment, the above UE for wireless communication is characterized in that the first processor also transmits a first reference signal. Herein, the first field of the first signaling and the second field of the second signaling are jointly used for determining that the first radio signal is related to the first signaling; the first signaling is used for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s); multi-antenna related processing(s) of K first sub-signal(s) is(are) respectively used for determining multi-antenna related processing(s) of the K radio sub-signal(s), the K first sub-signal(s) is(are) a subset of the P first sub-signal(s); P is a positive integer, K is a positive integer no greater than the P.

In one embodiment, the above UE for wireless communication is characterized in that the first processor also receives a second reference signal. Herein, the first field of the first signaling and the second field of the second signaling are jointly used for determining that the first radio signal is related to the first signaling; the first signaling is used for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) transmitted respectively by K second-type antenna port(s); multi-antenna related processing(s) of K second sub-signal(s) is(are) respectively used for determining multi-antenna related processing(s) of the K radio sub-signal(s), the K second sub-signal(s) is(are) a subset of the Q second sub-signal(s); Q is a positive integer, K is a positive integer no greater than the Q.

In one embodiment, the above UE for wireless communication is characterized in that the first processor also transmits uplink information. Herein, the uplink information is used for determining K1 second sub-signal(s), the K1 second sub-signal(s) is(are) a subset of the Q second sub-signal(s), and the K second sub-signal(s) is(are) a subset of the K1 second sub-signal(s), the K1 is a positive integer no greater than the Q and no less than the K.

In one embodiment, the above UE for wireless communication is characterized in that the first receiver also receives first downlink information. Herein, the first downlink information is used for determining T1 piece(s) of second-type scheduling information, the second-type scheduling information of the first reference signal is one of the T1 piece(s) of second-type scheduling information, T1 is a positive integer.

In one embodiment, the above UE for wireless communication is characterized in that the first receiver also receives second downlink information. Herein, the second downlink information is used for determining T2 piece(s) of third-type scheduling information, the third-type scheduling information of the second reference signal is one of the T2 piece(s) of third-type scheduling information, T2 is a positive integer.

In one embodiment, the above UE for wireless communication is characterized in that the first field of the first signaling is used for identifying the first reference signal.

In one embodiment, the above UE for wireless communication is characterized in that the first field of the first signaling is used for identifying the second reference signal.

In one embodiment, the above UE for wireless communication is characterized in that the first signaling is used for determining at least one of fourth-type scheduling information of the first radio signal or fifth-type scheduling information of the second signaling.

In one embodiment, the first processor includes a transceiver.

In one embodiment, the first processor includes a transmitter.

In one embodiment, the first processor includes a receiver.

The present disclosure provides a base station for wireless communication, comprising:

a first transmitter, transmitting a first signaling and a second signaling; and a second processor, executing a first radio signal;

herein, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the executing is transmitting, or the executing is receiving.

In one embodiment, the above base station for wireless communication is characterized in that when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one embodiment, the above base station for wireless communication is characterized in that the second processor also receives a first reference signal. Herein, the first field of the first signaling and the second field of the second signaling are jointly used for determining that the first radio signal is related to the first signaling; the first signaling is used for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s); multi-antenna related processing(s) of K first sub-signal(s) is(are) respectively used for determining multi-antenna related processing(s) of the K radio sub-signal(s), the K first sub-signal(s) is(are) a subset of the P first sub-signal(s); P is a positive integer, K is a positive integer no greater than the P.

In one embodiment, the above base station for wireless communication is characterized in that the second processor also transmits a second reference signal. Herein, the first field of the first signaling and the second field of the second signaling are jointly used for determining that the first radio signal is related to the first signaling; the first signaling is used for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) transmitted respectively by K second-type antenna port(s); multi-antenna related processing(s) of K second sub-signal(s) is(are) respectively used for determining multi-antenna related processing(s) of the K radio sub-signal(s), the K second sub-signal(s) is(are) a subset of the Q second sub-signal(s); Q is a positive integer, K is a positive integer no greater than the Q.

In one embodiment, the above base station for wireless communication is characterized in that the second processor also receives uplink information. Herein, the uplink information is used for determining K1 second sub-signal(s), the K1 second sub-signal(s) is(are) a subset of the Q second sub-signal(s), the K second sub-signal(s) is(are) a subset of the K1 second sub-signal(s), K1 is a positive integer no greater than the Q and no less than the K.

In one embodiment, the above base station for wireless communication is characterized in that the first transmitter also transmits first downlink information. Herein, the first downlink information is used for determining T1 piece(s) of second-type scheduling information, the second-type scheduling information of the first reference signal is one of the T1 piece(s) of second-type scheduling information, T1 is a positive integer.

In one embodiment, the above base station for wireless communication is characterized in that the first transmitter also transmits second downlink information. Herein, the second downlink information is used for determining T2 piece(s) of third-type scheduling information, the third-type scheduling information of the second reference signal is one of the T2 piece(s) of third-type scheduling information, T2 is a positive integer.

In one embodiment, the above base station for wireless communication is characterized in that the first field of the first signaling is used for identifying the first reference signal.

In one embodiment, the above base station for wireless communication is characterized in that the first field of the first signaling is used for identifying the second reference signal.

In one embodiment, the above base station for wireless communication is characterized in that the first signaling is used for determining at least one of fourth-type scheduling information of the first radio signal or fifth-type scheduling information of the second signaling.

In one embodiment, the second processor includes a transceiver.

In one embodiment, the second processor includes a transmitter.

In one embodiment, the second processor includes a receiver.

In one embodiment, the present disclosure is advantageous over conventional schemes in the following aspects:

Avoiding any potential misunderstanding or confusion that may arise from citation of a certain reference signal when the UE is scheduled to transmit or measure a plurality of reference signals, especially when the reference signals are aperiodic.

Allowing the UE to optimize multi-antenna related processing on uplink or downlink data through multi-antenna related measurement on reference signals or transmitting information, thus improving the data transmission quality.

In the case of reciprocity between uplink and downlink channels, utilizing the channel reciprocity to reduce the overhead for reference signals, signaling(s) and feedback.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Embodiment 1

Figure 1:
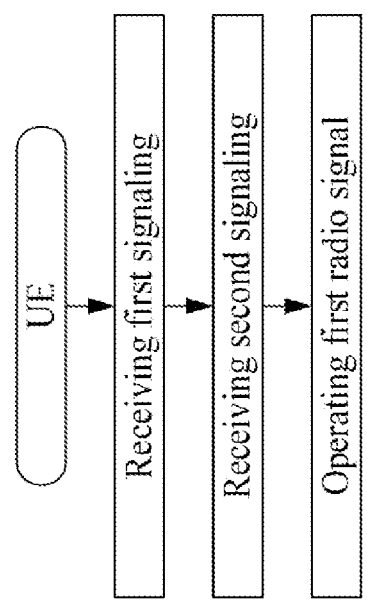
FIG. 1 illustrates a flowchart of a first signaling, a second signaling and a first radio signal according to one embodiment of the present disclosure.

Embodiment 1 illustrates a flowchart of a first signaling, a second signaling and a first radio signal, as shown in FIG. 1.

In Embodiment 1, the UE in the present disclosure receives a first signaling and then a second signaling, and operated a first radio signal. Herein, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the operating is receiving, or the operating is transmitting.

In one subembodiment, the first signaling is a physical layer signaling.

In one subembodiment, the second signaling is a physical layer signaling.

In one subembodiment, the first signaling is a dynamic signaling.

In one subembodiment, the second signaling is a dynamic signaling.

In one subembodiment, the first signaling and the second signaling are physical layer signalings, respectively.

In one subembodiment, the first signaling and the second signaling are dynamic signalings, respectively.

In one subembodiment, the first field and the second field are respectively composed of a positive integer number of bits.

In one subembodiment, a number of bits comprised in the first field is the same as a number of bits comprised in the second field.

In one subembodiment, when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one subembodiment, the first signaling is a last physical layer signaling received before the second signaling which comprises the first field.

In one subembodiment, the first signaling is a last physical layer signaling received before the second signaling which may be used for determining the first radio signal.

In one subembodiment, the physical layer signaling is DCI.

In one subembodiment, the first signaling is a dynamic signaling for UpLink Grant.

In one subembodiment, the first signaling is a dynamic signaling for DownLink Grant.

In one subembodiment, the second signaling is a dynamic signaling for UpLink Grant, the operating is transmitting.

In one subembodiment, the second signaling is a dynamic signaling for DownLink Grant, the operating is receiving.

In one subembodiment, the first-type scheduling information includes at least one of occupied time domain resources, occupied frequency domain resources, an MCS, a HARQ process number, an RV, an NDI, an occupied antenna port, a corresponding transmit beamforming vector, a corresponding receive beamforming vector, a corresponding transmit spatial filtering, or a corresponding receive spatial filtering.

In one subembodiment, the phrase that the first radio signal is related to the first signaling means that at least one of an antenna port occupied by the first radio signal, a transmit beamforming vector corresponding to the first radio signal, a receive beamforming vector corresponding to the first radio signal, a transmit spatial filtering corresponding to the first radio signal or a receive spatial filtering corresponding to the first radio signal is related to the first signaling.

In one subembodiment, the phrase that the first radio signal is related to the first signaling means that the first signaling is used for determining at least one of an antenna port occupied by the first radio signal, a transmit beamforming vector corresponding to the first radio signal, a receive beamforming vector corresponding to the first radio signal, a transmit spatial filtering corresponding to the first radio signal or a receive spatial filtering corresponding to the first radio signal.

In one subembodiment, the phrase that the first radio signal is related to the first signaling means that time-frequency resources occupied by the first radio signal are related to the first signaling.

In one subembodiment, the phrase that the first radio signal is related to the first signaling means that the first signaling is used for determining time-frequency resources occupied by the first radio signal.

In one subembodiment, the first signaling is transmitted on a downlink physical layer control channel (i.e., a downlink channel only capable of carrying a physical layer signaling).

In one subembodiment, the second signaling is transmitted on a downlink physical layer control channel (i.e., a downlink channel only capable of carrying a physical layer signaling).

In one subembodiment, the first signaling is a MAC CE signaling.

In one subembodiment, the first signaling is a higher layer signaling.

In one subembodiment, the first signaling is an RRC signaling.

In one subembodiment, the first signaling is transmitted on a downlink physical layer data channel (i.e., a downlink channel capable of carrying physical layer data).

In one subembodiment, the first radio signal is transmitted on an uplink physical layer data channel (i.e., an uplink channel capable of carrying physical layer data), the operating is transmitting.

In one subembodiment, the first radio signal is transmitted on a downlink physical layer data channel (i.e., a downlink channel capable of carrying physical layer data), the operating is receiving.

Embodiment 2

Figure 2:
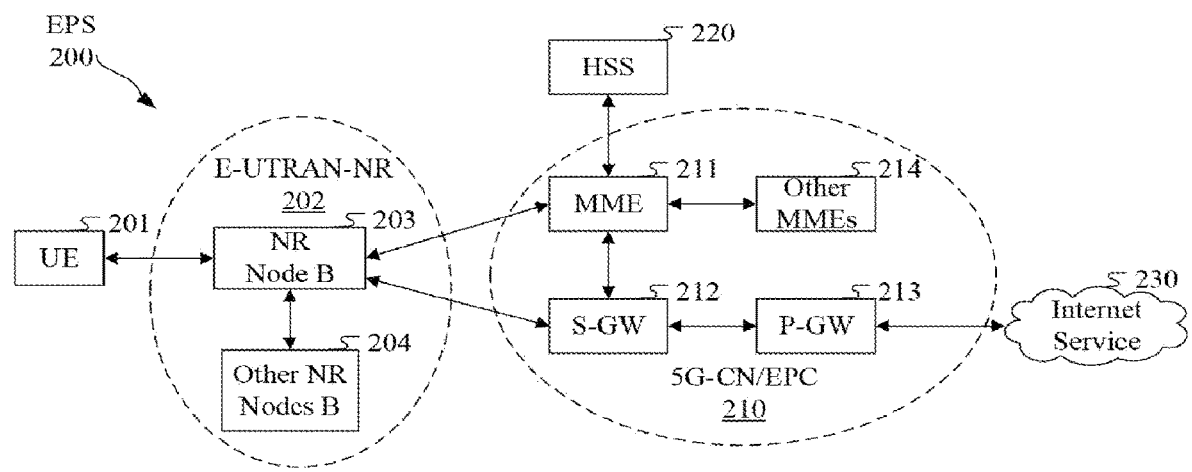
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-CoreNetwork/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane protocol terminations. The gNB 203 may be associated with other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is associated with the 5G-CN/EPC 210 via an S1 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is associated with the P-GW 213. The P-GW 213 provides UE IP address allocation and other functions. The P-GW 213 is associated with the Internet Service 230. The Internet Service 230 comprises operator-compatible IP services, specifically including Internet, Intranet, IP Multimedia Subsystem (IMS) and Packet Switching Streaming Services (PSSs).

In one subembodiment, the UE 201 corresponds to the UE in the present disclosure.

In one subembodiment, the gNB 203 corresponds to the base station in the present disclosure.

Embodiment 3

Figure 3:
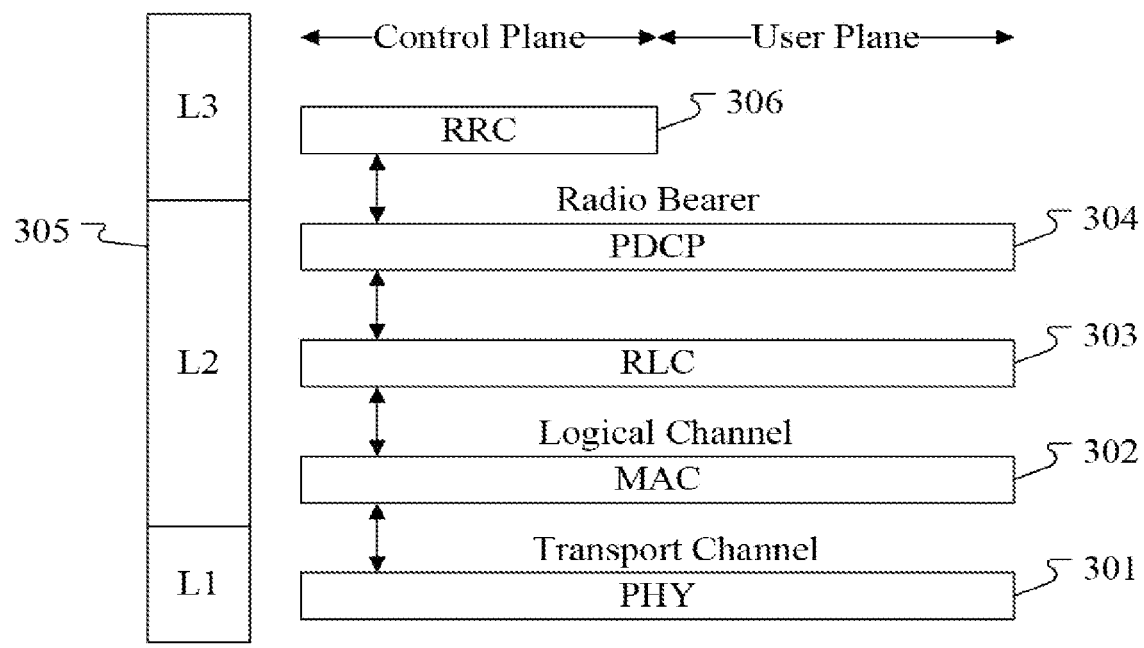
FIG. 3 illustrates a schematic diagram of an example of a radio protocol architecture of a user plane and a control plane according to one embodiment of the present disclosure.

Embodiment 3 illustrates a schematic diagram of an example of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the first signaling in the present disclosure is generated by the PHY 301.

In one subembodiment, the second signaling in the present disclosure is generated by the PHY 301.

In one subembodiment, the first radio signal in the present disclosure is generated by the PHY 301.

In one subembodiment, the first reference signal in the present disclosure is generated by the PHY 301.

In one subembodiment, the second reference signal in the present disclosure is generated by the PHY 301.

In one subembodiment, the uplink information in the present disclosure is generated by the PHY 301.

In one subembodiment, the first downlink information in the present disclosure is generated by the RRC sublayer 306.

In one subembodiment, the second downlink information in the present disclosure is generated by the RRC sublayer 306.

Embodiment 4

Figure 4:
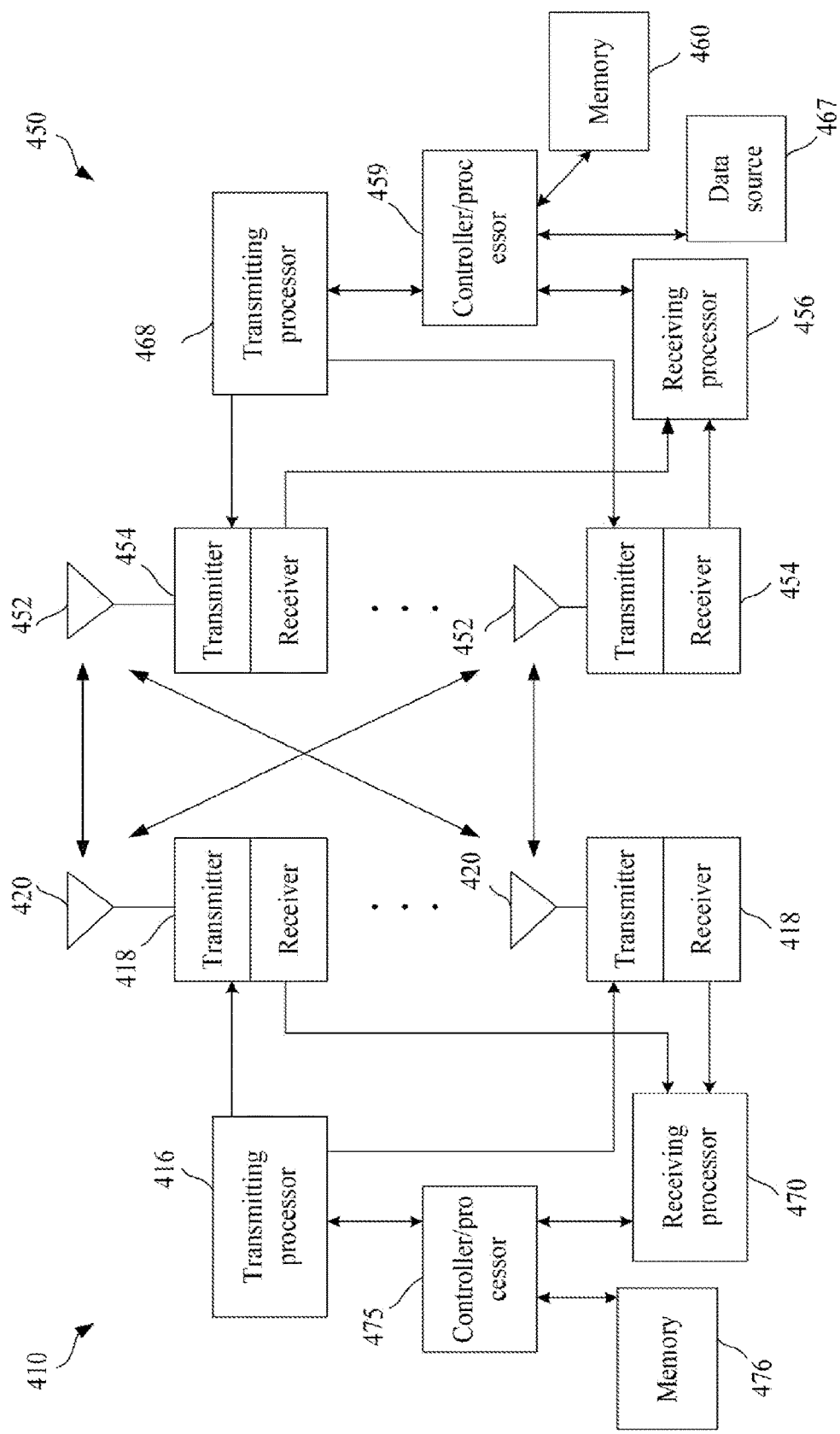
FIG. 4 illustrates a schematic diagram of an eNode and a UE according to one embodiment of the present disclosure.

Embodiment 4 illustrates a schematic diagram of an eNode and a UE, as shown in FIG. 4.

FIG. 4 is a block diagram of a gNB 410 in communication with UE 450 in an access network. In Downlink (DL) transmission, a higher layer packet from a core network is provided to a controller/processor 475. The controller/processor 475 implements the functionality of the L2 layer. In DL transmission, the controller/processor 475 provides header compression, encrypting, packet segmentation and reordering, multiplexing between a logical channel and a transport channel, and radio resource allocation for the UE 450 based on various priorities. The controller/processor 475 is also in charge of HARQ operation, retransmission of a lost packet, and a signaling to the UE 450. A transmitting processor 416 performs signal processing functions used for the L1 layer (that is, PHY). The signal processing functions include decoding and interleaving, so as to ensure a Forward Error Correction (FEC) at the UE 450 side and the mapping to signal clusters corresponding to each modulation scheme (i.e., BPSK, QPSK, M-PSK, and M-QAM). The decoded and modulated signals are divided into parallel streams. Each of the parallel streams is mapped into multi-carrier subcarriers to be multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. The multi-carrier symbol streams are subjected to spatial precoding to generate multiple spatial streams. Each spatial stream is provided to different antennas 420 via the transmitter 418. Each transmitter 418 modulates a Radio Frequency (RF) carrier using a corresponding spatial stream for transmitting. At the UE 450 side, every receiver 454 receives a signal via a corresponding antenna 452. Each receiver 454 recovers information modulated onto the RF carrier and provides the information to a receiving processor 456. The receiving processor 456 provides signal processing functions of the L1 layer. The receiving processor 456 performs spatial processing on the information to recover any UE 450-targeted spatial stream. When a plurality of spatial streams are targeted at the UE 450, then these spatial streams can be assembled into a single multicarrier symbol stream by the receiving processor 456. The receiving processor 456 then converts the multi-carrier symbol stream from time domain into frequency domain using FFT. A frequency domain signal includes a single multi-carrier symbol stream of each subcarrier used for multi-carrier signals. The symbols and reference signal on each subcarrier are recovered and demodulated by determining the most possible signal cluster point transmitted by the gNB 410, and a soft decision is generated. The soft decision is then decoded and de-interleaved so as to recover the data and control signal originally transmitted by the gNB 410 on the physical channel. The data and control signal are then provided to a controller/processor 459. The controller/processor 459 performs functions of the L2 layer. The controller/processor can be associated with a memory 460 that stores program code and data. The memory 460 is a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation. In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 selects an appropriate coding and modulation scheme to promote spatial processing. Spatial streams generated by the transmitting processor 468 are provided to different antennas 452 by a singular transmitter 454. Each transmitter 454 modulates an RF with a corresponding spatial stream for transmitting. The transmitting function of the gNB 410 in UL transmission is similar to the function of the receiver at the UE 450. Each receiver 418 receives a signal via a corresponding antenna 420. Each receiver 418 recovers information modulated onto the RF carrier and then provides the information to a receiving processor 470. The receiving processor 470 implements L1 layer functionality. The controller/processor 475 implements the L2 layer functionality. The controller/processor 475 can be associated with a memory 476 that stores program code and data. The memory 476 can be called a computer readable medium. In UL, the controller/processor 475 provides a demultiplexing between a transport channel and a logical channel, packet reassembling, decrypting, header decompression, and control signal processing so as to recover a higher-layer packet from the UE 450. The higher-layer packet from the controller/processor 475 can be provided to the core network. The controller/processor 475 is also in charge of error detection using ACK and/or NACK protocols to support HARQ operation.

In one subembodiment, the UE 450 comprises at least one processor and at least one memory. The at least one memory includes computer program codes. The at least one memory and the computer program codes are configured to be used in collaboration with the at least one processor.

In one subembodiment, the UE 450 comprises a memory that stores a computer readable instruction program. The computer readable instruction program generates an action when executed by at least one processor. The action includes: receiving the first signaling in the present disclosure, receiving the second signaling in the present disclosure, transmitting the first radio signal in the present disclosure, and receiving the first radio signal.

In one subembodiment, the gNB 410 comprises at least one processor and at least one memory. The at least one memory includes computer program codes. The at least one memory and the computer program codes are configured to be used in collaboration with the at least one processor.

In one subembodiment, the gNB 410 comprises a memory that stores a computer readable instruction program. The computer readable instruction program generates an action when executed by at least one processor. The action includes: transmitting the first signaling, transmitting the second signaling, receiving the first radio signal and transmitting the first radio signal.

In one subembodiment, the UE 450 corresponds to the UE in the present disclosure.

In one subembodiment, the gNB 410 corresponds to the base station in the present disclosure.

In one subembodiment, at least one of the transmitting processor 416 or the controller/processor 475 is used for transmitting the first signaling in the present disclosure, while at least one of the receiving processor 456 or the controller/processor 459 is used for receiving the first signaling in the present disclosure.

In one subembodiment, at least one of the transmitting processor 416 or the controller/processor 475 is used for transmitting the second signaling in the present disclosure, while at least one of the receiving processor 456 or the controller/processor 459 is used for receiving the second signaling in the present disclosure.

In one subembodiment, at least one of the transmitting processor 416 or the controller/processor 475 is used for transmitting the first radio signal in the present disclosure, while at least one of the receiving processor 456 or the controller/processor 459 is used for receiving the first radio signal in the present disclosure.

In one subembodiment, at least one of the transmitting processor 468 or the controller/processor 459 is used for transmitting the first radio signal in the present disclosure, while at least one of the receiving processor 470 or the controller/processor 475 is used for receiving the first radio signal in the present disclosure.

In one subembodiment, at least one of the transmitting processor 468 or the controller/processor 459 is used for transmitting the first reference signal in the present disclosure, while at least one of the receiving processor 470 or the controller/processor 475 is used for receiving the first reference signal in the present disclosure.

In one subembodiment, at least one of the transmitting processor 416 or the controller/processor 475 is used for transmitting the second reference signal in the present disclosure, while at least one of the receiving processor 456 or the controller/processor 459 is used for receiving the second reference signal in the present disclosure.

In one subembodiment, at least one of the transmitting processor 468 or the controller/processor 459 is used for transmitting the uplink information in the present disclosure, while at least one of the receiving processor 470 or the controller/processor 475 is used for receiving the uplink information in the present disclosure.

In one subembodiment, at least one of the transmitting processor 416 or the controller/processor 475 is used for transmitting the first downlink information in the present disclosure, while at least one of the receiving processor 456 or the controller/processor 459 is used for receiving the first downlink information in the present disclosure.

In one subembodiment, at least one of the transmitting processor 416 or the controller/processor 475 is used for transmitting the second downlink information in the present disclosure, while at least one of the receiving processor 456 or the controller/processor 459 is used for receiving the second downlink information in the present disclosure.

Embodiment 5

Figure 5:
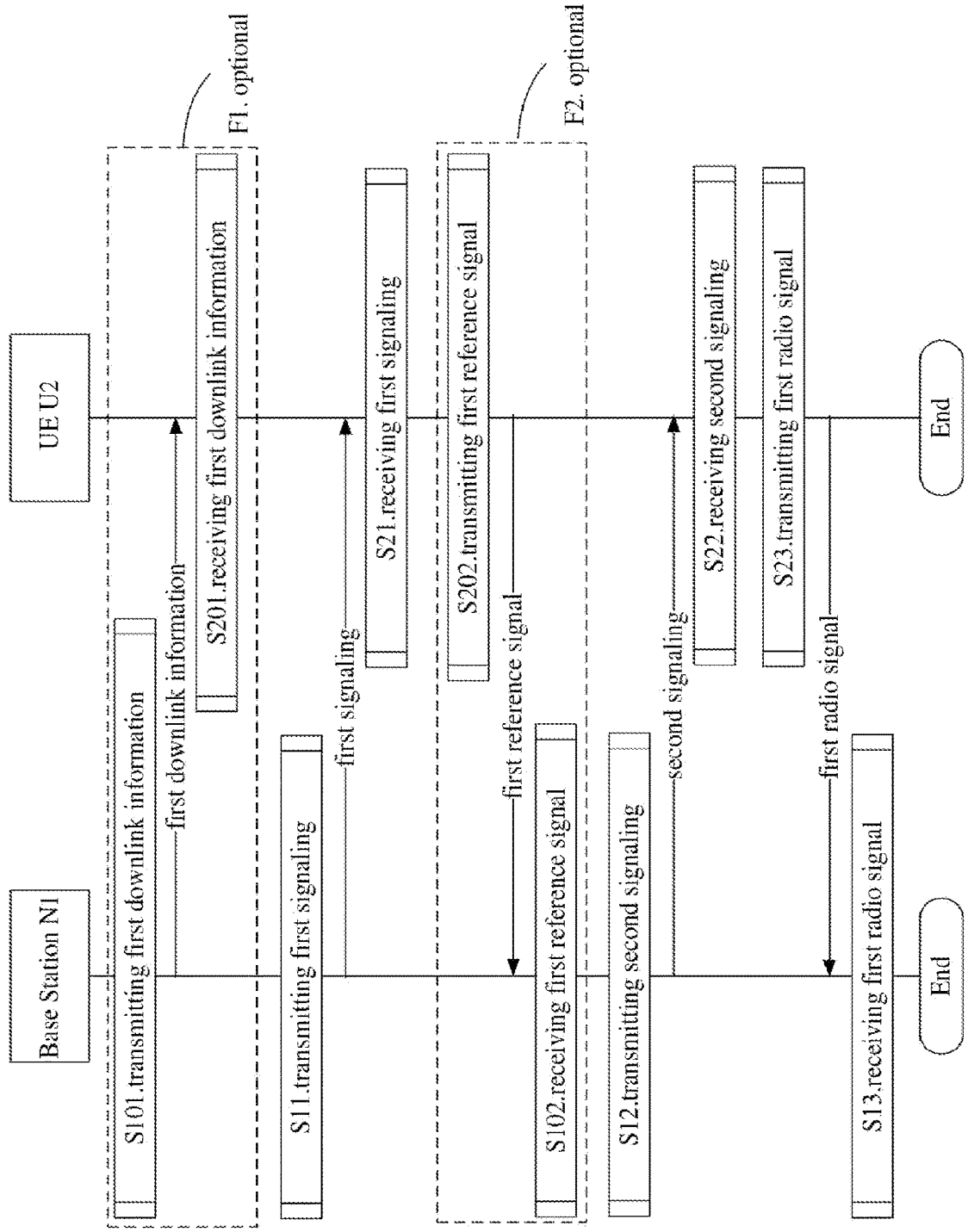
FIG. 5 illustrates a flowchart of a wireless transmission according to one embodiment of the present disclosure.

Embodiment 5 illustrates a flowchart of a wireless transmission, as shown in FIG. 5. In FIG. 5, a base station N1 is a maintenance base station for a serving cell of a UE U2. In FIG. 5, steps in box F1 and box F2 are optional, respectively.

The N1 transmits first downlink information in step S101; transmits a first signaling in step S11; receives a first reference signal in step S102; transmits a second signaling in step S12; and receives a first radio signal in step S13.

The U2 receives first downlink information in step S201; receives a first signaling in step S21; transmits a first reference signal in step S202; receives a second signaling in step S22; and transmits a first radio signal in step S23.

In Embodiment 5, the first signaling comprises a first field, the second signaling comprises a second field; the second signaling comprises first-type scheduling information of the first radio signal; the first field of the first signaling and the second field of the second signaling are jointly used by the U2 for determining whether the first radio signal is related to the first signaling. The first signaling is used by the U2 for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s). When the first field of the first signaling and the second field of the second signaling are jointly used by the U2 for determining that the first radio signal is related to the first signaling, multi-antenna related processing(s) of K first sub-signal(s) is(are) respectively used for determining multi-antenna related processing(s) of the K radio sub-signal(s), the K first sub-signal(s) is(are) a subset of the P first sub-signal(s); P is a positive integer, K is a positive integer no greater than the P. The first downlink information is used by the U2 for determining T1 piece(s) of second-type scheduling information, the second-type scheduling information of the first reference signal is one of the T1 piece(s) of second-type scheduling information, the T1 is a positive integer.

In one subembodiment, the first field and the second field are respectively composed of a positive integer number of bits.

In one subembodiment, a number of bits comprised in the first field is the same as a number of bits comprised in the second field.

In one subembodiment, when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one subembodiment, the first signaling is a dynamic signaling used for UpLink Grant.

In one subembodiment, the first signaling is a dynamic signaling used for DownLink Grant.

In one subembodiment, the second signaling is a dynamic signaling used for UpLink Grant.

In one subembodiment, the first radio signal is transmitted on an uplink physical layer data channel (i.e., an uplink channel capable of carrying physical layer data).

In one subembodiment, the first-type scheduling information includes at least one of occupied time domain resources, occupied frequency domain resources, an MCS, a HARQ process number, an RV, an NDI, an occupied antenna port, a corresponding transmit beamforming vector, a corresponding receive beamforming vector, a corresponding transmit spatial filtering, or a corresponding receive spatial filtering.

In one subembodiment, the first signaling is used for triggering transmission of the first reference signal.

In one subembodiment, the second signaling is used by the U2 for determining the K first sub-signal(s) out of the P first sub-signal(s).

In one subembodiment, the second signaling indicates an index of each of the K first sub-signal(s) in the P first sub-signal(s).

In one subembodiment, the first reference signal is an SRS.

In one subembodiment, the second-type scheduling information includes at least one of occupied time domain resources, occupied frequency domain resources, occupied code domain resources, cyclic shift, an OCC, an occupied antenna port, a corresponding transmit beamforming vector, a corresponding receive beamforming vector, a corresponding transmit spatial filtering or a corresponding receive spatial filtering.

In one subembodiment, K first-type antenna port(s) is(are) a subset of the P first-type antenna port(s), the K first-type antenna port(s) is(are) respectively used for transmitting the K first sub-signal(s), the K first-type antenna port(s) respectively corresponds(correspond) to the K second-type antenna port(s).

In one subembodiment, multi-antenna related transmission(s) of the K first sub-signal(s) is(are) respectively used by the U2 for determining multi-antenna related transmission(s) of the K radio sub-signal(s).

In one subembodiment, any of the K first-type antenna port(s) is QCL with a corresponding second-type antenna port.

In one subembodiment, any of the K second-type antenna port(s) and a corresponding first-type antenna port correspond to a same beamforming vector.

In one subembodiment, any of the K second-type antenna port(s) and a corresponding first-type antenna port correspond to a same analog beamforming vector.

In one subembodiment, measurement(s) on the K first sub-signal(s) is(are) used by the N1 for determining an MCS of the first radio signal, the operating is transmitting.

In one subembodiment, receiving quality(qualities) respectively corresponding to the K first sub-signal(s) is(are) used by the N1 for determining an MCS of the first radio signal, the operating is transmitting.

In one subembodiment, multi-antenna related reception(s) of the K first sub-signal(s) is(are) respectively used by the N1 for determining multi-antenna related reception(s) of the K radio sub-signal(s).

In one subembodiment, measurement(s) on the K first sub-signal(s) is(are) respectively used by the N1 for determining receive beamforming vector(s) of the K radio sub-signal(s).

In one subembodiment, measurement(s) on the K first sub-signal(s) is(are) respectively used by the N1 for determining receive analog beamforming vector(s) of the K radio sub-signal(s).

In one subembodiment, the first reference signal occurs only once in time domain.

In one subembodiment, the first reference signal occurs multiple times in time domain.

In one subembodiment, the first signaling is used by the U2 for determining second-type scheduling information of the first reference signal out of the T1 piece(s) of second-type scheduling information.

In one subembodiment, the first field of the first signaling is used for identifying the first reference signal.

In one subembodiment, the first signaling is used by the U2 for determining at least one of fourth-type scheduling information of the first radio signal or fifth-type scheduling information of the second signaling.

In one subembodiment, the fourth-type scheduling information belongs to a target information set, the first-type scheduling information belongs to the target information set, the target information set comprises a positive integer number of piece(s) of information; any piece of information in the target information set is and can only be one of the first-type scheduling information or the fourth-type scheduling information, the target information set comprises at least two of occupied time domain resources, occupied frequency domain resources, an MCS, a HARQ process number, an RV, an NDI, an occupied antenna port, a corresponding transmit beamforming vector, a corresponding receive beamforming vector, a corresponding transmit spatial filtering, or a corresponding receive spatial filtering.

In one subembodiment, the fifth-type scheduling information includes at least one of occupied time domain resources, occupied frequency domain resources, a number of information bits comprised, an identifying integer, an occupied antenna port, a corresponding transmit beamforming vector, a corresponding receive beamforming vector, a corresponding transmit spatial filtering, or a corresponding receive spatial filtering.

In one subembodiment, the identifying integer is an RNTI.

Embodiment 6

Figure 6:
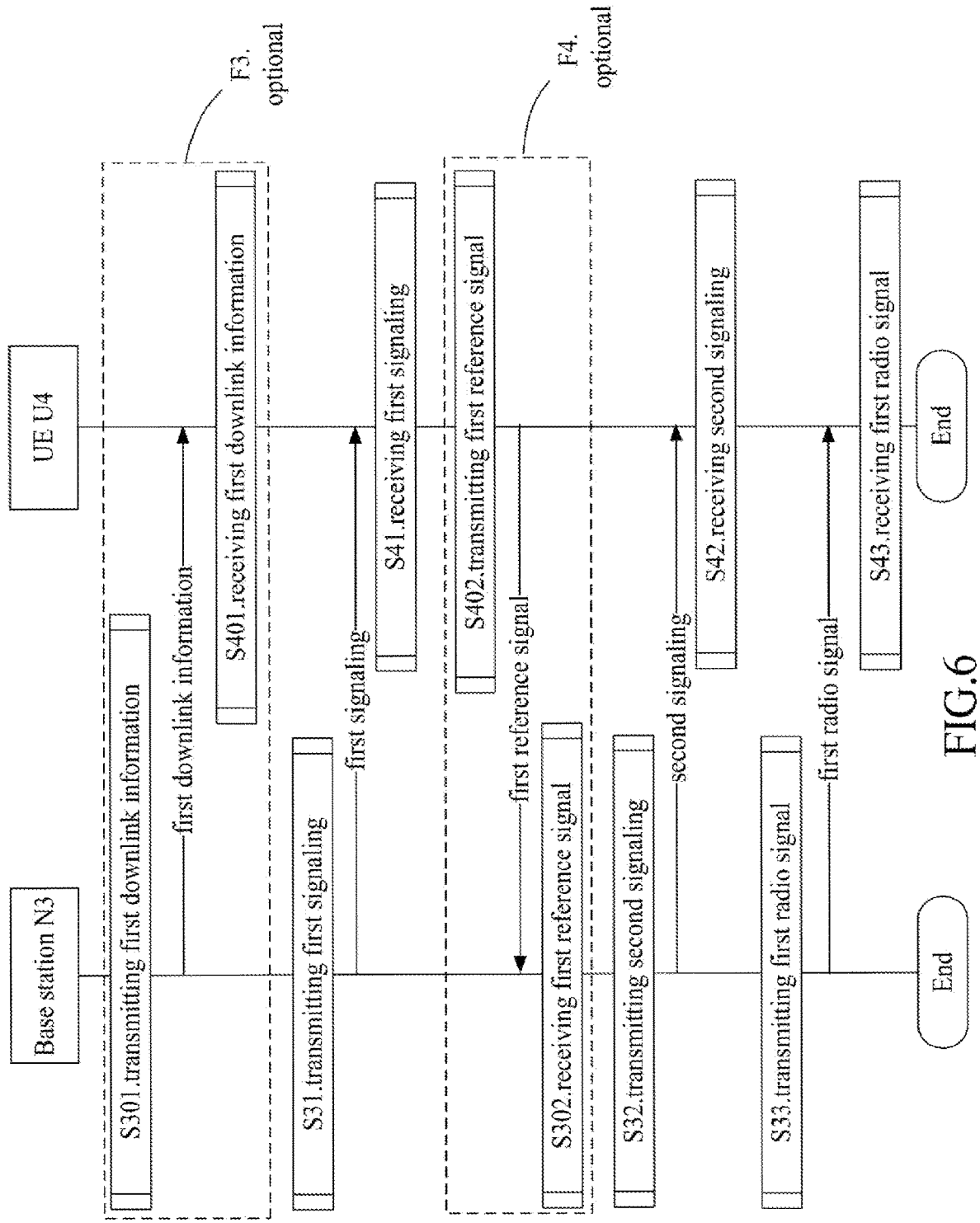
FIG. 6 illustrates a flowchart of a wireless transmission according to another embodiment of the present disclosure.

Embodiment 6 illustrates a flowchart of a wireless transmission, as shown in FIG. 6. In FIG. 6, a base station N3 is a maintenance base station for a serving cell of the UE U4. In FIG. 6, steps in box F3 and F4 are optional, respectively.

The N3 transmits first downlink information in step S301; transmits a first signaling in step S31; receives a first reference signal in step S302; transmits a second signaling in step S32; and transmits a first radio signal in step S33.

The U4 receives first downlink information in step S401; receives a first signaling in step S41; transmits a first reference signal in step S402; receives a second signaling in step S42; and receives a first radio signal in step S43.

In Embodiment 6, the first signaling comprises a first field, the second signaling comprises a second field; the second signaling comprises first-type scheduling information of the first radio signal; the first field of the first signaling and the second field of the second signaling are jointly used by the U4 for determining whether the first radio signal is related to the first signaling. The first signaling is used by the U4 for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s). When the first field of the first signaling and the second field of the second signaling are jointly used by the U4 for determining that the first radio signal is related to the first signaling, multi-antenna related processing(s) of K first sub-signal(s) is(are) respectively used for determining multi-antenna related processing(s) of the K radio sub-signal(s), the K first sub-signal(s) is(are) a subset of the P first sub-signal(s); P is a positive integer, K is a positive integer no greater than the P. The first downlink information is used by the U4 for determining T1 piece(s) of second-type scheduling information, the second-type scheduling information of the first reference signal is one of the T1 piece(s) of second-type scheduling information, the T1 is a positive integer.

In one subembodiment, the second signaling is a dynamic signaling used for DownLink Grant.

In one subembodiment, the first radio signal is transmitted on a downlink physical layer data channel (i.e., a downlink channel capable of carrying physical layer data).

In one subembodiment, K first-type antenna port(s) is(are) a subset of the P first-type antenna port(s)), the K first-type antenna port(s) is(are) respectively used for transmitting the K first sub-signal(s), the K first-type antenna port(s) respectively corresponds(correspond) to the K second-type antenna port(s).

In one subembodiment, multi-antenna related reception(s) of the K first sub-signal(s) is(are) respectively used by the N3 for determining multi-antenna related transmission(s) of the K radio sub-signal(s).

In one subembodiment, measurement(s) on the K first sub-signal(s) is(are) respectively used by the N3 for determining beamforming vector(s) corresponding to the K second-type antenna port(s).

In one subembodiment, measurement(s) on the K first sub-signal(s) is(are) respectively used by the N3 for determining analog beamforming vector(s) corresponding to the K second-type antenna port(s).

In one subembodiment, multi-antenna related transmission(s) of the K first sub-signal(s) is(are) respectively used by the U4 for determining multi-antenna related reception(s) of the K radio sub-signal(s).

In one subembodiment, beamforming vector(s) corresponding to the K first-type antenna port(s) is(are) respectively used by the U4 as receive beamforming vector(s) of the K radio sub-signal(s).

In one subembodiment, analog beamforming vector(s) corresponding to the K first-type antenna port(s) is(are) respectively used by the U4 as receive analog beamforming vector(s) of the K radio sub-signal(s).

Embodiment 7

Figure 7:
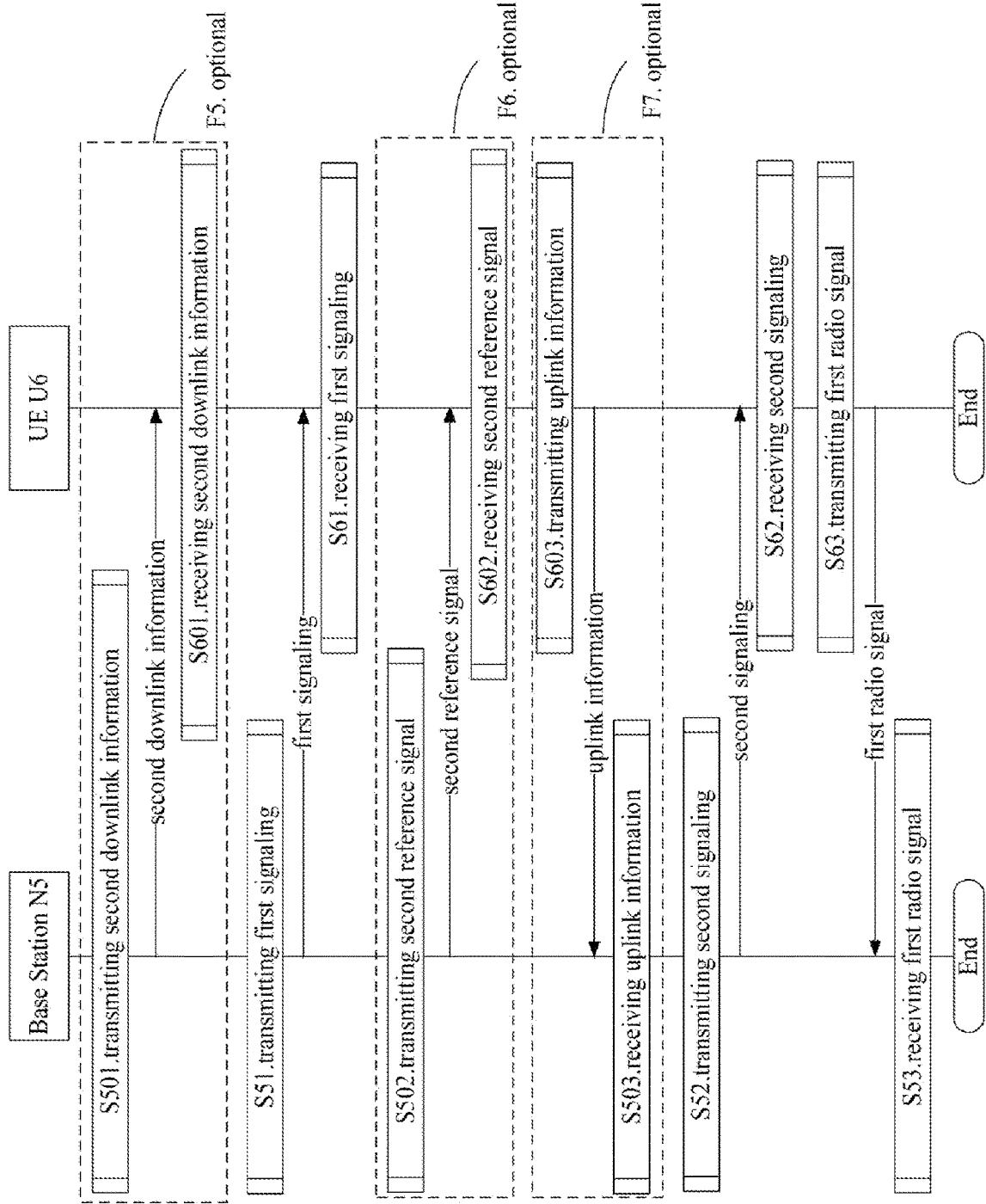
FIG. 7 illustrates a flowchart of a wireless transmission according to another embodiment of the present disclosure.

Embodiment 7 illustrates a flowchart of a wireless transmission, as shown in FIG. 7. In FIG. 7, a base station N5 is a maintenance base station for a serving cell of a UE U6. In FIG. 7, steps in box F5, box F6 and box F7 are optional, respectively.

The N5 transmits second downlink information in step S501; transmits a first signaling in step S51; transmits a second reference signal in step S502; receives uplink information in step S503; transmits a second signaling in step S52; and receives a first radio signal in step S53.

The U6 receives second downlink information in step S601; receives a first signaling in step S61; receives a second reference signal in step S602; transmits uplink information in step S603; receives a second signaling in step S62; and transmits a first radio signal in step S63.

In Embodiment 7, the first signaling comprises a first field, the second signaling comprises a second field; the second signaling comprises first-type scheduling information of the first radio signal; the first field of the first signaling and the second field of the second signaling are jointly used by the U6 for determining whether the first radio signal is related to the first signaling. The first signaling is used by the U6 for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) transmitted respectively by K second-type antenna port(s). When the first field of the first signaling and the second field of the second signaling are jointly used by the U6 for determining that the first radio signal is related to the first signaling, multi-antenna related processing(s) of K second sub-signal(s) is(are) respectively used for determining multi-antenna related processing(s) of the K radio sub-signal(s), the K second sub-signal(s) is(are) a subset of the Q second sub-signal(s); Q is a positive integer, K is a positive integer no greater than the Q. The uplink information is used by the N5 for determining K1 second sub-signal(s), the K1 second sub-signal(s) is(are) a subset of the Q second sub-signal(s), the K second sub-signal(s) is(are) a subset of the K1 second sub-signal(s), K1 is a positive integer no greater than the Q and no less than the K. The second downlink information is used by the U6 for determining T2 piece(s) of third-type scheduling information, the third-type scheduling information of the second reference signal is one of the T2 piece(s) of third-type scheduling information, T2 is a positive integer.

In one subembodiment, the third-type scheduling information includes at least one of occupied time domain resources, occupied frequency domain resources, occupied code domain resources, cyclic shift, an OCC, an occupied antenna port, a corresponding transmit beamforming vector, a corresponding receive beamforming vector, a corresponding transmit spatial filtering or a corresponding receive spatial filtering.

In one subembodiment, the first signaling is used for triggering a measurement on the second reference signal.

In one subembodiment, the second signaling is used by the U6 for determining the K second sub-signal(s) out of the Q second sub-signal(s).

In one subembodiment, the second reference signal includes at least one of CSI-RS, DMRS, TRS, PTRS, PSS, SSS, PSSS or SSSS.

In one subembodiment, K third-type antenna port(s) is(are) a subset of the Q third-type antenna port(s), the K third-type antenna port(s) is(are) respectively used for transmitting the K second sub-signal(s), the K third-type antenna port(s) respectively corresponds(correspond) to the K second-type antenna port(s).

In one subembodiment, multi-antenna related reception(s) of the K second sub-signal(s) is(are) respectively used by the U6 for determining multi-antenna related transmission(s) of the K radio sub-signal(s).

In one subembodiment, measurement(s) on the K second sub-signal(s) is(are) respectively used by the U6 for determining beamforming vector(s) corresponding to the K second-type antenna port(s).

In one subembodiment, measurement(s) on the K second sub-signal(s) is(are) respectively used by the U6 for determining analog beamforming vector(s) corresponding to the K second-type antenna port(s).

In one subembodiment, multi-antenna related transmission(s) of the K second sub-signal(s) is(are) respectively used by the N5 for determining multi-antenna related reception(s) of the K radio sub-signal(s).

In one subembodiment, beamforming vector(s) corresponding to the K third-type antenna port(s) is(are) respectively used by the N5 as receive beamforming vector(s) of the K radio sub-signal(s).

In one subembodiment, analog beamforming vector(s) corresponding to the K third-type antenna port(s) is(are)

respectively used by the N5 as receive analog beamforming vector(s) of the K radio sub-signal(s).

In one subembodiment, the second reference signal occurs only once in time domain.

In one subembodiment, the second reference signal occurs multiple times in time domain.

In one subembodiment, a measurement on the second reference signal is used by the U6 for determining the K1 second sub-signal(s).

In one subembodiment, a receiving quality of any of the K1 second sub-signal(s) is greater than a receiving quality of any of the Q second sub-signals not belonging to the K1 second sub-signal(s).

In one subembodiment, the K1 is equal to the K.

In one subembodiment, the K1 is greater than the K.

In one subembodiment, the K1 is less than the Q.

In one subembodiment, the uplink information includes UCI.

In one subembodiment, the first signaling is used by the U6 for determining third-type scheduling information of the second reference signal out of the T2 piece(s) of third-type scheduling information.

In one subembodiment, the first field of the first signaling is used for identifying the second reference signal.

Embodiment 8

Figure 8:
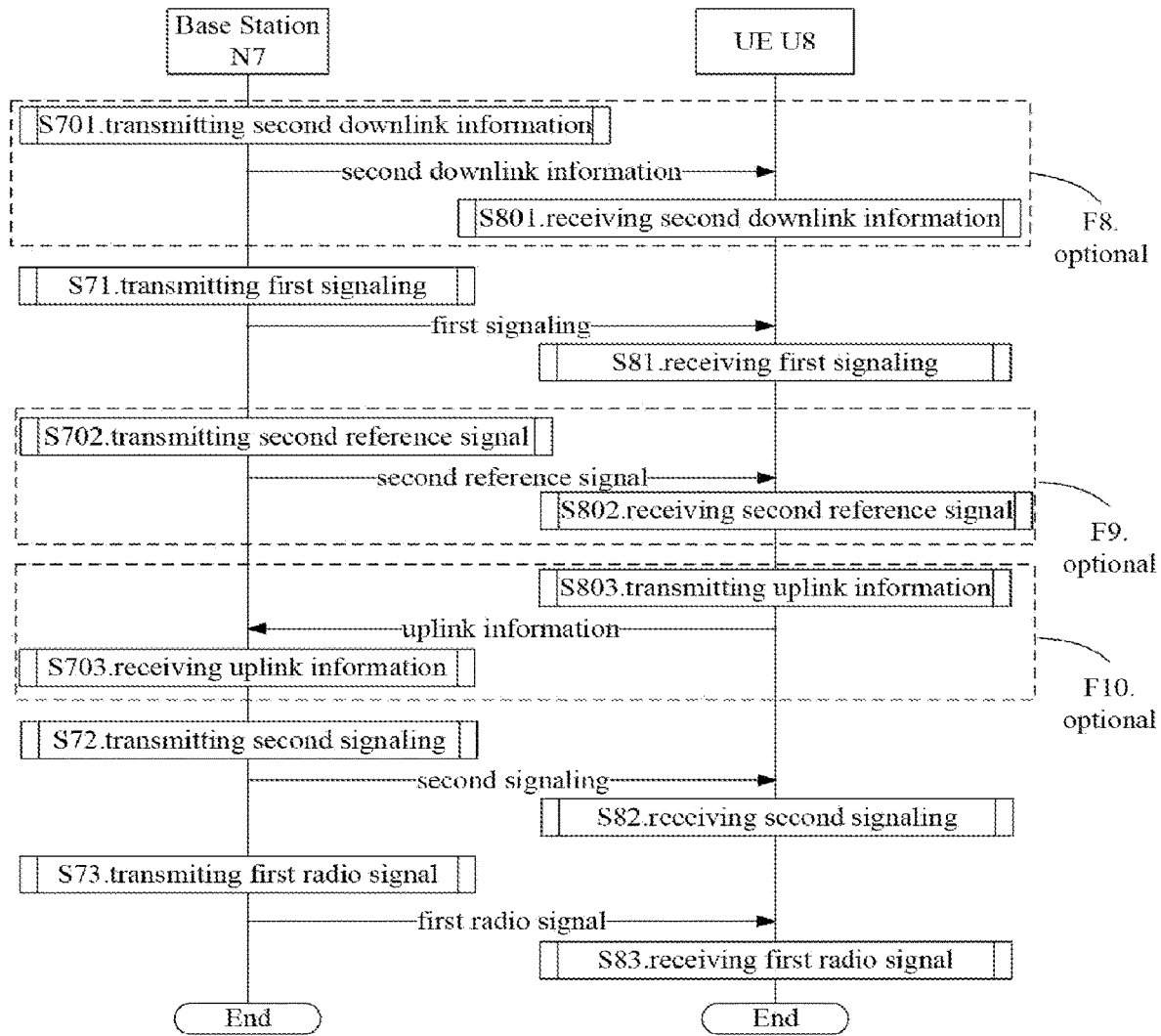
FIG. 8 illustrates a flowchart of a wireless transmission according to another embodiment of the present disclosure.

Embodiment 8 illustrates a flowchart of a wireless transmission, as shown in FIG. 8. In FIG. 8, a base station N7 is a maintenance base station for a serving cell of a UE U8. In FIG. 8, steps in box F8, box F9 and box F10 are optional, respectively.

The N7 transmits second downlink information in step S701; transmits a first signaling in step S71; transmits a second reference signal in step S702; receives uplink information in step S703; transmits a second signaling in step S72; and transmits a first radio signal in step S73.

The U8 receives second downlink information in step S801; receives a first signaling in step S81; receives a second reference signal in step S802; transmits uplink information in step S803; receives a second signaling in step S83; and receives a first radio signal in step S83.

In Embodiment 8, the first signaling comprises a first field, the second signaling comprises a second field; the second signaling comprises first-type scheduling information of the first radio signal; the first field of the first signaling and the second field of the second signaling are jointly used by the U8 for determining whether the first radio signal is related to the first signaling. The first signaling is used by the U8 for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) transmitted respectively by K second-type antenna port(s). When the first field of the first signaling and the second field of the second signaling are jointly used by the U8 for determining that the first radio signal is related to the first signaling, multi-antenna related processing(s) of K second sub-signal(s) is(are) respectively used for determining multi-antenna related processing(s) of the K radio sub-signal(s), the K second sub-signal(s) is(are) a subset of the Q second sub-signal(s); Q is a positive integer, and K is a positive integer no greater than the Q. The uplink information is used by the N7 for determining K1 second sub-signal(s), the K1 second sub-signal(s) is(are) a subset of the Q second sub-signal(s), the K second sub-signal(s) is(are) a subset of the K1 second sub-signal(s), the K1 is a positive integer no greater than the Q and no less than the K. The second downlink information is used by the U8 for determining T2 piece(s) of third-type scheduling information, the third-type scheduling information of the second reference signal is one of the T2 piece(s) of third-type scheduling information, T2 is a positive integer.

In one subembodiment, multi-antenna related transmission(s) of the K second sub-signal(s) is(are) respectively used by the N7 for determining multi-antenna related transmission(s) of the K radio sub-signal(s).

In one subembodiment, any of the K third-type antenna port(s) is QCL with a corresponding second-type antenna port.

In one subembodiment, any of the K second-type antenna port(s) and a corresponding third-type antenna port correspond to a same beamforming vector.

In one subembodiment, any of the K second-type antenna port(s) and a corresponding third-type antenna port correspond to a same analog beamforming vector.

In one subembodiment, multi-antenna related reception(s) of the K second sub-signal(s) is(are) respectively used by the U8 for determining multi-antenna related reception(s) of the K radio sub-signal(s).

In one subembodiment, measurement(s) on the K second sub-signal(s) is(are) respectively used by the U8 for determining a receive beamforming vector(s) of the K radio sub-signal(s).

In one subembodiment, measurement(s) on the K second sub-signal(s) is(are) respectively used by the U8 for determining a receive analog beamforming vector(s) of the K radio sub-signal(s).

Embodiment 9

Figure 9:
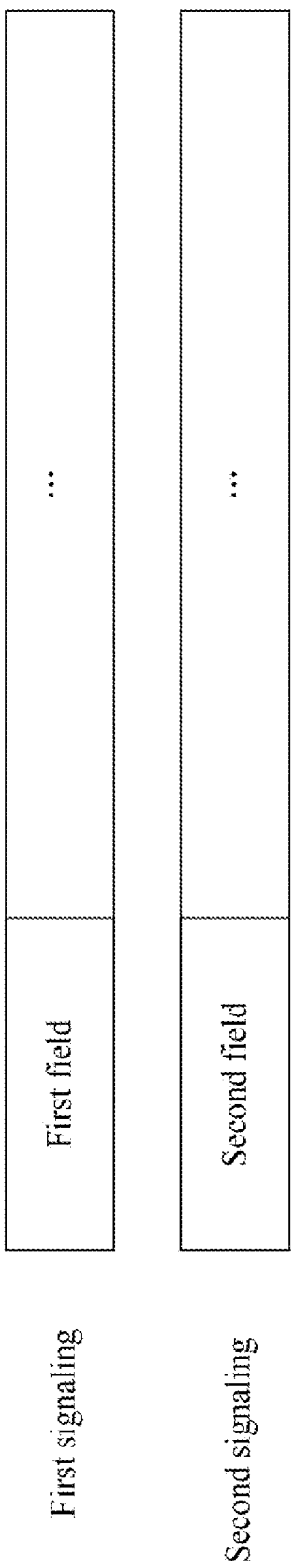
FIG. 9 illustrates a schematic diagram of a first signaling and a second signaling according to one embodiment of the present disclosure.

Embodiment 9 illustrates a schematic diagram of a first signaling and a second signaling, as shown in FIG. 9.

In Embodiment 9, the first signaling comprises a first field, the second field comprises a second field; the first field of the first signaling and the second field of the second signaling are jointly used for determining whether the first radio signal is related to the first signaling. The first field and the second field are respectively composed of a positive integer number of bits.

In one subembodiment, a number of bits comprised in the first field is the same as a number of bits comprised in the second field.

In one subembodiment, when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

Embodiment 10

Figure 10:
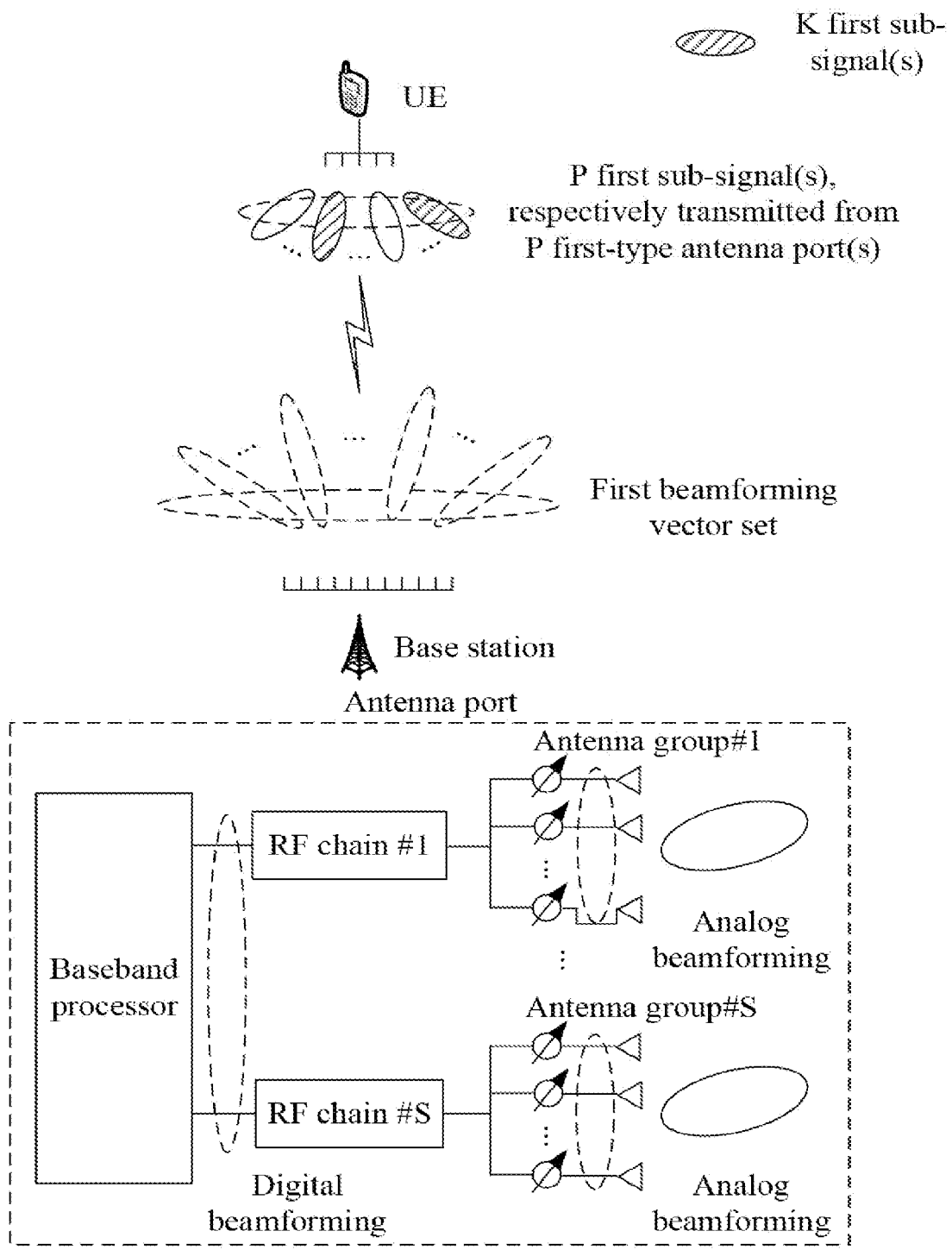
FIG. 10 illustrates a schematic diagram of relation(s) between K first sub-signal(s) and P first sub-signal(s) according to one embodiment of the present disclosure.

Embodiment 10 illustrates a schematic diagram of relation(s) between K first sub-signal(s) and P first sub-signal(s), as shown in FIG. 10.

In Embodiment 10, the first reference signal in the present disclosure comprises P first sub-signal(s), wherein the P first sub-signal(s) is(are) transmitted respectively by P first-type antenna port(s); multi-antenna related processing(s) of K first sub-signal(s) is(are) respectively used for determining multi-antenna related processing(s) of the K radio subsignal(s) in the present disclosure, the K first sub-signal(s) is(are) a subset of the P first sub-signal(s). A measurement on the first reference signal is used for determining the K first sub-signal(s) out of the P first sub-signal(s). The K radio sub-signal(s) is(are) transmitted respectively by K second-type antenna port(s), K first-type antenna port(s) is(are) a subset of the P first-type antenna port(s), the K first-type antenna port(s) is(are) respectively used for transmitting the K first sub-signal(s), the K first-type antenna port(s) respectively corresponds(correspond) to the K second-type antenna port(s).

In FIG. 10, an antenna port is formed by a plurality of antennas of one or more antenna groups through antenna virtualization, wherein mapping coefficients of the plurality of antennas of the one or more antenna groups to the antenna port constitute a beamforming vector. One of the antenna group is connected to a baseband processor via a Radio Frequency (RF) chain. Mapping coefficients of a plurality of antennas within the same antenna group to the antenna port constitute an analog beamforming vector for the antenna group, all antenna groups comprised in the antenna port correspond to a same analog beamforming vector. Mapping coefficients of all antenna ports comprised in the antenna port constitute a digital beamforming vector for the antenna port. The beamforming vector for the antenna port is a Kronecker product of a corresponding analog beamforming vector and a corresponding digital beamforming vector.

In one subembodiment, measurement(s) on the P first sub-signal(s) is(are) respectively used for determining P receiving quality(qualities).

In one subembodiment, a receiving quality of any of the K first sub-signal(s) is greater than a receiving quality of any of the P first sub-signals not belonging to the K first sub-signal(s).

In one subembodiment, any of the P receiving quality (qualities) is an RSRP.

In one subembodiment, any of the P receiving quality (qualities) is an RSRQ.

In one subembodiment, any of the P receiving quality (qualities) is a CQI.

In one subembodiment, P first beamforming vector(s) respectively corresponds(correspond) to the P first sub-signal(s), the P first beamforming vector(s) respectively belongs(belong) to a first beamforming vector set, the first beamforming vector set comprises a positive integer number of beamforming vector(s). For any given first sub-signal of the P first sub-signal(s), a corresponding first beamforming vector is a given first beamforming vector. A receiving quality obtained by a target receiver of the first reference signal when receiving the given first sub-signal employing the given first beamforming vector is higher than a receiving quality obtained by the target receiver of the first reference signal when receiving the given first sub-signal employing any beamforming vector of the first beamforming vector set other than the given first beamforming vector.

In one subembodiment, the P receiving quality(qualities) is(are) receiving quality(qualities) obtained when the target receiver of the first reference signal receives the P first sub-signal(s) respectively employing the P first beamforming vector(s).

In one subembodiment, K first beamforming vector(s) is(are) first beamforming vector(s) respectively corresponding to the K first sub-signal(s) out of the P first beamforming vector(s).

In one subembodiment, a receiving quality obtained by a target receiver of the first reference signal when employing any of the K first beamforming vector(s) to receive a corresponding first sub-signal is greater than a receiving quality obtained by the target receiver of the first reference signal when employing any of the P first beamforming vectors not belonging to the K first beamforming vector(s) to receive a corresponding first sub-signal.

In one subembodiment, any of the K second-type antenna port(s) and a corresponding third-type antenna port correspond to a same beamforming vector, the operating in the present disclosure is transmitting, the executing in the present disclosure is receiving.

In one subembodiment, any of the K second-type antenna port(s) and a corresponding third-type antenna port correspond to a same analog beamforming vector, the operating is transmitting, the executing is receiving.

In one subembodiment, any of the K second-type antenna port(s) and a corresponding first-type antenna port correspond to a same analog beamforming vector and a same digital beamforming vector, the operating is transmitting, the executing is receiving.

In one subembodiment, the K first beamforming vector(s) is(are) respectively used as receive beamforming vector(s) of the K radio sub-signal(s), the operating is transmitting, the executing is receiving.

In one subembodiment, the K first beamforming vector(s) is(are) respectively used as receive analog beamforming vector(s) of the K radio sub-signal(s), the operating is transmitting, the executing is receiving.

In one subembodiment, the K first beamforming vector(s) is(are) respectively used as beamforming vector(s) corresponding to the K second-type antenna port(s), the operating is receiving, the executing is transmitting.

In one subembodiment, the K first beamforming vector(s) is(are) respectively used as analog beamforming vector(s) corresponding to the K second-type antenna port(s), the operating is receiving, the executing is transmitting.

In one subembodiment, beamforming vector(s) corresponding to the K first-type antenna port(s) is(are) respectively used as receive beamforming vector(s) of the K radio sub-signal(s), the operating is receiving, the executing is transmitting.

In one subembodiment, analog beamforming vector(s) corresponding to the K first-type antenna port(s) is(are) respectively used as receive analog beamforming vector(s) of the K radio sub-signal(s), the operating is receiving, the executing is transmitting.

Embodiment 11

Figure 11:
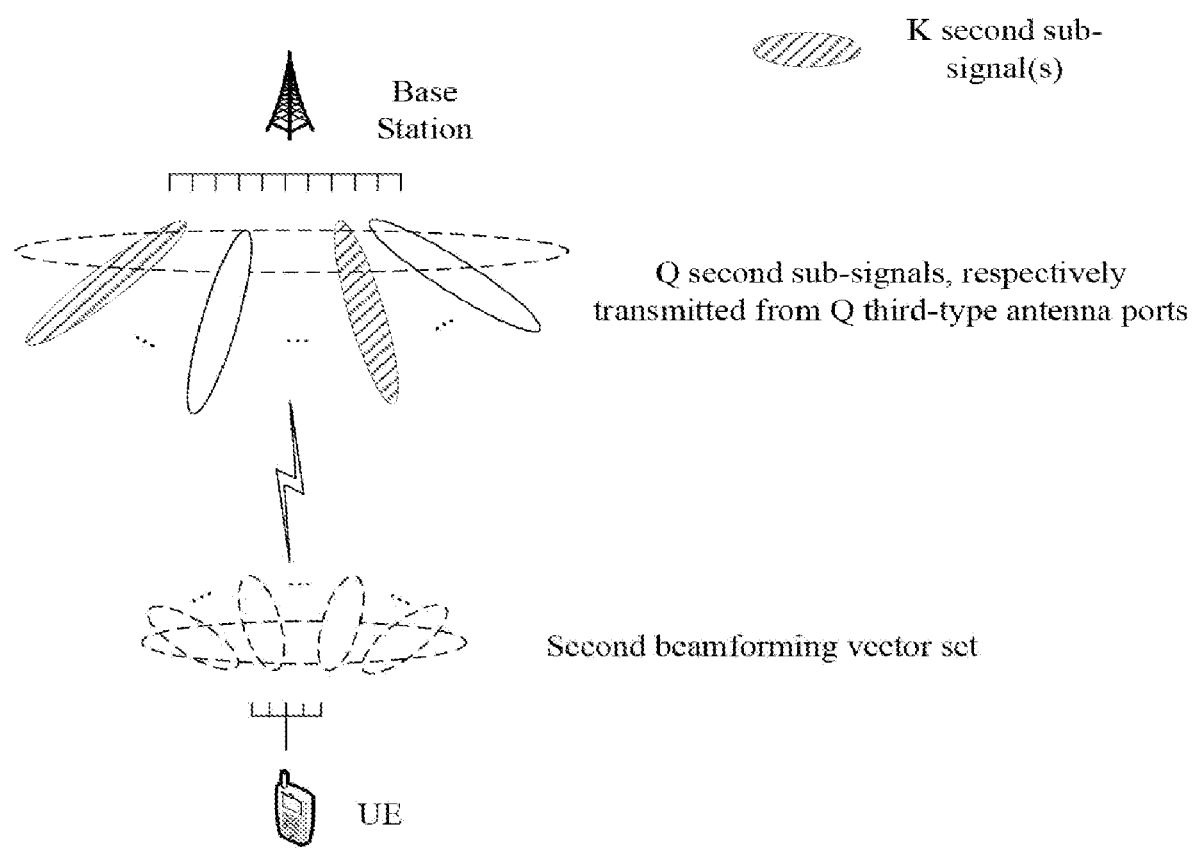
FIG. 11 illustrates a schematic diagram of relation(s) between K second sub-signal(s) and Q second sub-signal(s) according to one embodiment of the present disclosure.

Embodiment 11 illustrates a schematic diagram of relation(s) between K second sub-signal(s) and Q second sub-signal(s), as shown in FIG. 11.

In Embodiment 11, the second reference signal in the present disclosure comprises Q second sub-signal(s), the Q second sub-signal(s) is(are) respectively transmitted by Q third-type antenna port(s); multi-antenna related processing(s) of K second sub-signal(s) is(are) respectively used for determining multi-antenna related processing(s) of the K radio sub-signal(s) in the present disclosure, the K second sub-signal(s) is(are) a subset of the Q second sub-signal(s). A measurement on the second reference signal is used for determining the K second sub-signal(s) out of the Q second sub-signal(s). The K radio sub-signal(s) is(are) respectively transmitted by K second-type antenna port(s), K third-type antenna port(s) is(are) a subset of the Q third-type antenna port(s), the K third-type antenna port(s) is(are) respectively used for transmitting the K second sub-signal(s), the K third-type antenna port(s) respectively corresponds(correspond) to the K second-type antenna port(s).

In one subembodiment, measurement(s) on the Q second sub-signal(s) is(are) respectively used for determining Q receiving quality(qualities).

In one subembodiment, a receiving quality of any of the K second sub-signal(s) is greater than a receiving quality of any of the Q second sub-signals not belonging to the K second sub-signal(s).

In one subembodiment, any of the Q receiving quality (qualities) is an RSRP.

In one subembodiment, any of the Q receiving quality (qualities) is an RSRQ.

In one subembodiment, any of the Q receiving quality (qualities) is a CQI.

In one subembodiment, Q second beamforming vector(s) respectively corresponds(correspond) to the Q second sub-signal(s), the Q second beamforming vector(s) respectively belongs(belong) to a second beamforming vector set, the second beamforming vector set comprises a positive integer number of beamforming vector(s). For any given second sub-signal of the Q second sub-signal(s), a corresponding second beamforming vector is a given second beamforming vector. A receiving quality obtained by the UE of the present disclosure when receiving the given second sub-signal employing the given second beamforming vector is higher than a receiving quality obtained by the UE when receiving the given second sub-signal employing any beamforming vector of the second beamforming vector set other than the given second beamforming vector.

In one subembodiment, the Q receiving quality(qualities) is(are) receiving quality(qualities) obtained when the UE receives the Q second sub-signal(s) respectively employing the Q second beamforming vector(s).

In one subembodiment, K second beamforming vector(s) is(are) second beamforming vector(s) respectively corresponding to the K second sub-signal(s) out of the Q second beamforming vector(s).

In one subembodiment, a receiving quality obtained by the UE when employing any of the K second beamforming vector(s) to receive a corresponding second sub-signal is greater than a receiving quality obtained by the UE when employing any of the Q second beamforming vectors not belonging to the K second beamforming vector(s) to receive a corresponding second sub-signal.

In one subembodiment, any of the K second-type antenna port(s) and a corresponding third-type antenna port correspond to a same beamforming vector, the operating in the present disclosure is receiving, the executing in the present disclosure is transmitting.

In one subembodiment, any of the K second-type antenna port(s) and a corresponding third-type antenna port correspond to a same analog beamforming vector, the operating is receiving, the executing is transmitting.

In one subembodiment, any of the K second-type antenna port(s) and a corresponding third-type antenna port correspond to a same analog beamforming vector and a same digital beamforming vector, the operating is receiving, the executing is transmitting.

In one subembodiment, the K second beamforming vector(s) is(are) respectively used as receive beamforming vector(s) of the K radio sub-signal(s), the operating is receiving, the executing is transmitting.

In one subembodiment, the K second beamforming vector(s) is(are) respectively used as receive analog beamforming vector(s) of the K radio sub-signal(s), the operating is receiving, the executing is transmitting.

In one subembodiment, the K second beamforming vector(s) is(are) respectively used as beamforming vector(s) corresponding to the K second-type antenna port(s), the operating is transmitting, the executing is receiving.

In one subembodiment, the K second beamforming vector(s) is(are) respectively used as analog beamforming vector(s) corresponding to the K second-type antenna port(s), the operating is transmitting, the executing is receiving.

In one subembodiment, beamforming vector(s) corresponding to the K third-type antenna port(s) is(are) respectively used as receive beamforming vector(s) of the K radio sub-signal(s), the operating is transmitting, the executing is receiving.

In one subembodiment, analog beamforming vector(s) corresponding to the K third-type antenna port(s) is(are) respectively used as receive analog beamforming vector(s) of the K radio sub-signal(s), the operating is transmitting, the executing is receiving.

Embodiment 12

Figure 12:
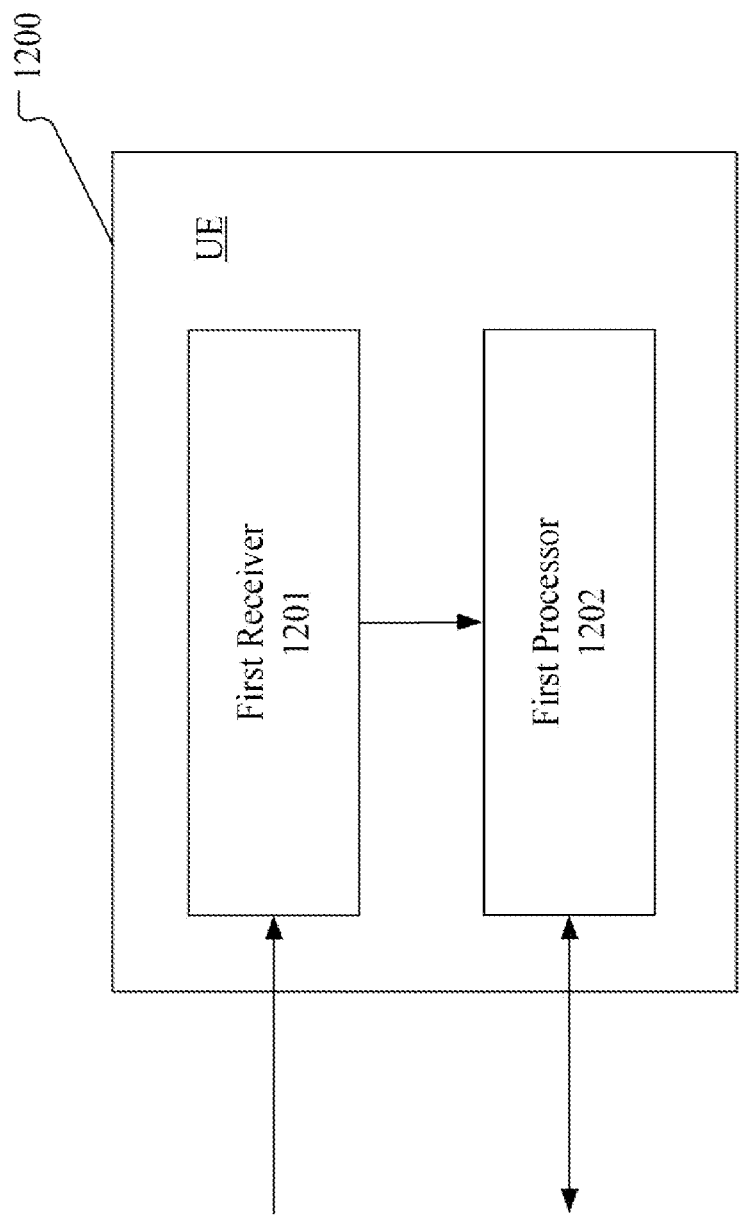
FIG. 12 illustrates a structure block diagram of a processing device in a UE according to one embodiment of the present disclosure.

Embodiment 12 illustrates a structure block diagram of a processing device in a UE, as shown in FIG. 12. In FIG. 12, a processing device 1200 in a UE consists of a first receiver 1201 and a first processor 1202.

In Embodiment 12, the first receiver 1201 receives a first signaling and a second signaling; the first processor 1202 operates a first radio signal.

In Embodiment 12, the first signaling comprises a first field, the second signaling comprises a second field; the second signaling comprises first-type scheduling information of the first radio signal; the first field of the first signaling and the second field of the second signaling are jointly used by the first processor 1202 for determining whether the first radio signal is related to the first signaling; the operating is receiving, or the operating is transmitting.

In one subembodiment, when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one subembodiment, the first processor 1202 also transmits a first reference signal. Herein, the first field of the first signaling and the second field of the second signaling are jointly used by the first processor 1202 for determining that the first radio signal is related to the first signaling; the first signaling is used by the first processor 1202 for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s); multi-antenna related processing(s) of K first sub-signal(s) is(are) respectively used for determining multi-antenna related processing(s) of the K radio sub-signal(s), the K first sub-signal(s) is(are) a subset of the P first sub-signal(s); P is a positive integer, K is a positive integer no greater than the P.

In one subembodiment, the first processor 1202 also receives a second reference signal. Herein, the first field of the first signaling and the second field of the second signaling are jointly used by the first processor 1202 for determining that the first radio is related to the first signaling; the first signaling is used by the first processor 1202 for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) respectively transmitted by K second-type antenna port(s); multi-antenna related processing(s) of the K second sub-signal(s) is(are) respectively used for determining multi-antenna related processing(s) of the K radio sub-signal(s), the K second sub-signal(s) is(are) a subset of the Q second sub-signal(s); Q is a positive integer, K is a positive integer no greater than the Q.

In one subembodiment, the first processor 1202 also transmits uplink information. Herein, the uplink information is used for determining K1 second sub-signal(s), the K1 second sub-signal(s) is(are) a subset of the Q second sub-signal(s), the K second sub-signal(s) is(are) a subset of the K1 second sub-signal(s), K1 is a positive integer no greater than the Q and no less than the K.

In one subembodiment, the first receiver 1201 also receives first downlink information. Herein, the first downlink information is used by the first receiver 1201 for determining T1 piece(s) of second-type scheduling information, the second-type scheduling information of the first reference signal is one of the T1 piece(s) of second-type scheduling information, T1 is a positive integer.

In one subembodiment, the first receiver 1201 also receives second downlink information. Herein, the second downlink information is used by the first receiver 1201 for determining T2 piece(s) of third-type scheduling information, the third-type scheduling information of the second reference signal is one of the T2 piece(s) of third-type scheduling information, T2 is a positive integer.

In one subembodiment, the first field of the first signaling is used for identifying the first reference signal.

In one subembodiment, the first field of the first signaling is used for identifying the second reference signal.

In one subembodiment, the first signaling is used for determining at least one of fourth-type scheduling information of the first radio signal or fifth-type scheduling information of the second signaling.

In one subembodiment, the first receiver 1201 comprises at least one of the receiving processor 456 or the controller/processor 459 in Embodiment 4.

In one subembodiment, the first processor 1202 comprises at least one of the receiving processor 456 or the controller/processor 459 in Embodiment 4.

In one subembodiment, the first processor 1202 comprises at least one of the transmitting processor 468 or the controller/processor 459 in Embodiment 4.

Embodiment 13

Figure 13:
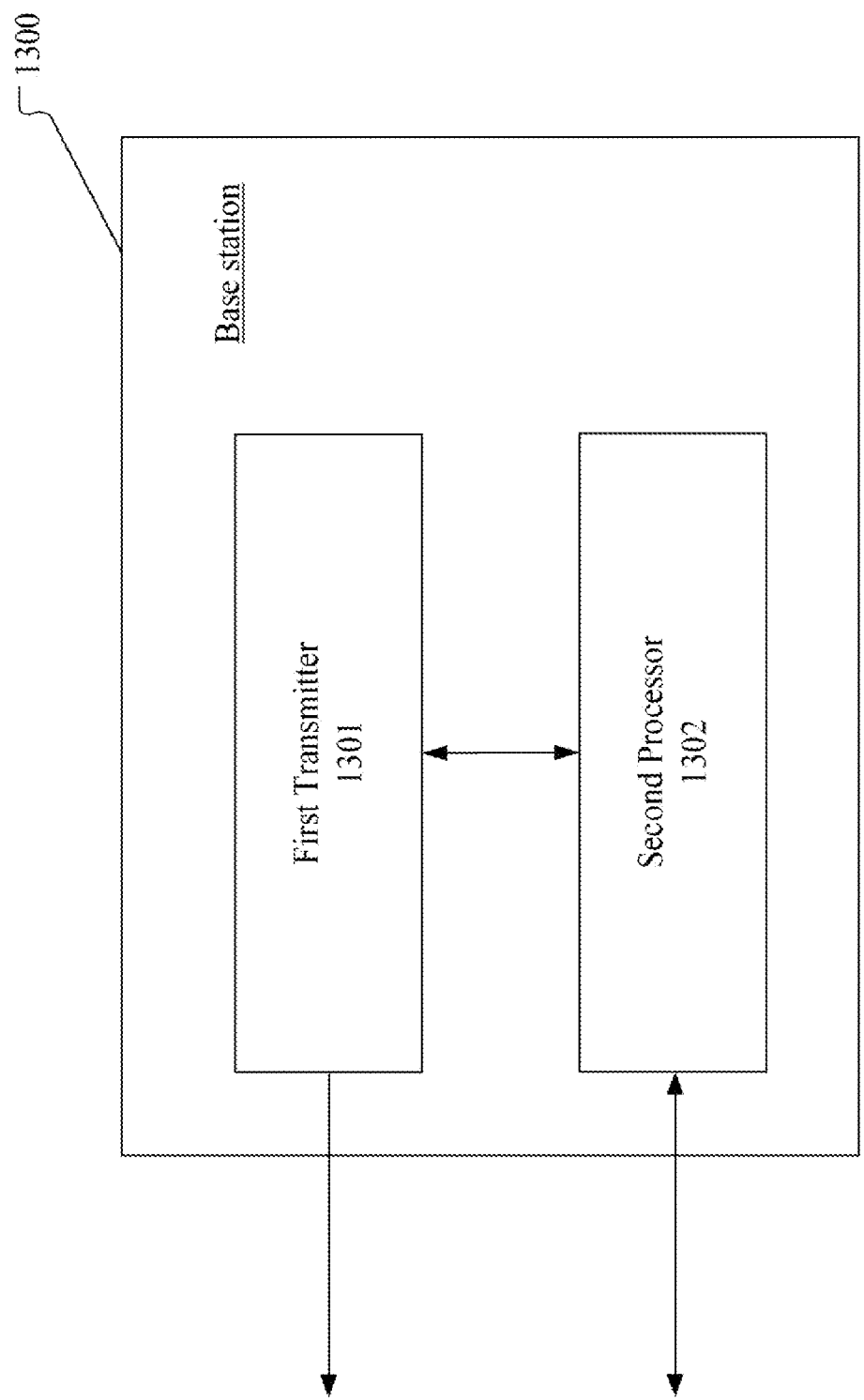
FIG. 13 illustrates a structure block diagram of a processing device in a base station according to one embodiment of the present disclosure.

Embodiment 13 illustrates a structure block diagram of a processing device in a base station, as shown in FIG. 13. In FIG. 13, a processing device 1300 in a base station consists of a first transmitter 1301 and a second processor 1302.

In Embodiment 13, the first transmitter 1301 transmits a first signaling and a second signaling; the second processor 1302 executes a first radio signal.

In Embodiment 13, the first signaling comprises a first field, the second signaling comprises a second field; the second signaling comprises first-type scheduling information of the first radio signal; the first field of the first signaling and the second field of the second signaling are jointly used for determining whether the first radio signal is related to the first signaling; the executing is transmitting, or the executing is receiving.

In one subembodiment, when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

In one subembodiment, the second processor 1302 also receives a first reference signal. Herein, the first field of the first signaling and the second field of the second signaling are jointly used for determining that the first radio signal is related to the first signaling; the first signaling is used for determining second-type scheduling information of the first reference signal; the first reference signal comprises P first sub-signal(s), the P first sub-signal(s) is(are) transmitted respectively by P first-type antenna port(s); the first radio signal comprises K radio sub-signal(s), the K radio sub-signal(s) is(are) transmitted respectively by K second-type antenna port(s); multi-antenna related processing(s) of K first sub-signal(s) is(are) respectively used for determining multi-antenna related processing(s) of the K radio sub-signal(s), the K first sub-signal(s) is(are) a subset of the P first sub-signal(s); P is a positive integer, K is a positive integer no greater than the P.

In one subembodiment, the second processor 1302 also transmits a second reference signal. Herein, the first field of the first signaling and the second field of the second signaling are jointly used for determining that the first radio signal is related to the first signaling; the first signaling is used for determining third-type scheduling information of the second reference signal; the second reference signal comprises Q second sub-signal(s), the Q second sub-signal(s) is(are) respectively transmitted by Q third-type antenna port(s); the first radio signal comprises K radio sub-signal(s), the K radio sub-signal(s) is(are) transmitted respectively by K second-type antenna port(s); multi-antenna related processing(s) of K second sub-signal(s) is(are) respectively used for determining multi-antenna related processing(s) of the K radio sub-signal(s), the K second sub-signal(s) is(are) a subset of the Q second sub-signal(s); Q is a positive integer, K is a positive integer no greater than the Q.

In one subembodiment, the second processor 1302 also receives uplink information. Herein, the uplink information is used by the second processor 1302 for determining K1 second sub-signal(s), the K1 second sub-signal(s) is(are) a subset of the Q second sub-signal(s), the K second sub-signal(s) is(are) a subset of the K1 second sub-signal(s), K1 is a positive integer no greater than the Q and no less than the K.

In one subembodiment, the first transmitter 1301 also transmits first downlink information. Herein, the first downlink information is used for determining T1 piece(s) of second-type scheduling information, the second-type scheduling information of the first reference signal is one of the T1 piece(s) of second-type scheduling information, T1 is a positive integer.

In one subembodiment, the first transmitter 1301 also transmits second downlink information. Herein, the second downlink information is used for determining T2 piece(s) of third-type scheduling information, the third-type scheduling information of the second reference signal is one of the T2 piece(s) of third-type scheduling information, T2 is a positive integer.

In one subembodiment, the first field of the first signaling is used for identifying the first reference signal.

In one subembodiment, the first field of the first signaling is used for identifying the second reference signal.

In one subembodiment, the first signaling is used for determining at least one of fourth-type scheduling information of the first radio signal or fifth-type scheduling information of the second signaling.

In one subembodiment, the first transmitter 1301 comprises at least one of the transmitting processor 416 or the controller/processor 475 in Embodiment 4.

In one subembodiment, the second processor 1302 comprises at least one of the receiving processor 470 or the controller/processor 475 in Embodiment 4.

In one subembodiment, the second processor 1302 comprises at least one of the transmitting processor 416 or the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
    receiving a first signaling;
    receiving a second signaling; and
    transmitting a first radio signal;
    wherein the first signaling comprises a first field, the second signaling comprises a second field; the first field and the second field are respectively composed of a positive integer number of bits; the second signaling is a Download Control Information (DCI), and the second signaling comprises first-type scheduling information of the first radio signal; the first field of the first signaling and the second field of the second signaling are jointly used for determining whether the first radio signal is related to the first signaling; the second signaling is transmitted on a Physical DownlinkControl Channel (PDCCH); the first radio signal is transmitted on a Physical Uplink Shared CHannel (PUSCH); comprising:
    transmitting a first reference signal, the first reference signal is a Sounding Reference Signal (SRS); wherein the first field of the first signaling and the second field of the second signaling are jointly used for determining that the first radio signal is related to the first signaling, the first signaling is used for determining second-type scheduling information of the first reference signal, the first reference signal comprises P first sub-signal(s), the P first sub-signal(s) is(are) transmitted respectively by P first-type antenna port(s), the first radio signal comprises K radio sub-signal(s), the K radio sub-signal(s) is(are) transmitted respectively by K second-type antenna port(s), multi-antenna related processing(s) of K first sub-signal(s) is(are) respectively used for determining multiantenna related processing(s) of the K radio sub-signal(s), the K first sub-signal(s) is(are) a subset of the P first sub-signal(s), P is a positive integer, K is a positive integer no greater than the P.

2. The method according to claim 1, wherein when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

3. The method according to claim 1, wherein the first signaling is a Radio Resource Control (RRC) signaling, and the first signaling is transmitted on a PDSCH.

4. The method according to claim 1, wherein the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same spatial filtering.

5. The method according to claim 1, wherein the second signaling comprises a third field, the third field comprises an SRS Resource Indicator (SRI), the third field of the second signaling is used for determining the K first sub-signal(s) out of the P first sub-signal(s).

6. A method in a base station for wireless communication, comprising:
    transmitting a first signaling;
    transmitting a second signaling; and
    receiving a first radio signal;
    wherein the first signaling comprises a first field, the second signaling comprises a second field; the first field and the second field are respectively composed of a positive integer number of bits; the second signaling is a Download Control Information (DCI), and the second signaling comprises first-type scheduling information of the first radio signal; the first field of the first signaling and the second field of the second signaling are jointly used for determining whether the first radio signal is related to the first signaling; the second signaling is transmitted on a Physical DownlinkControl Channel (PDCCH); the first radio signal is transmitted on a Physical Uplink Shared CHannel (PUSCH); comprising:
    receiving a first reference signal, the first reference signal is a Sounding Reference Signal (SRS); wherein the first field of the first signaling and the second field of the second signaling are jointly used for determining that the first radio signal is related to the first signaling, the first signaling is used for determining second-type scheduling information of the first reference signal, the first reference signal comprises P first sub-signal(s), the P first sub-signal(s) is(are) transmitted respectively by P first-type antenna port(s), the first radio signal comprises K radio sub-signal(s), the K radio subsignal(s) is(are) transmitted respectively by K second-type antenna port(s), multi-antenna related processing(s) of K first sub-signal(s) is(are) respectively used for determining multi-antenna related processing(s) of the K radio sub-signal(s), the K first sub-signal(s) is(are) a subset of the P first sub-signal(s), P is a positive integer, K is a positive integer no greater than the P.

7. The method according to claim 6, wherein when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

8. The method according to claim 1, wherein the first signaling is a Radio Resource Control (RRC) signaling, and the first signaling is transmitted on a PDSCH.

9. The method according to claim 6, wherein the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same spatial filtering.

10. The method according to claim 6, wherein the second signaling comprises a third field, the third field comprises an SRS Resource Indicator (SRI), the third field of the second signaling is used for determining the K first sub-signal(s) out of the P first sub-signal(s).

11. A User Equipment (UE) for wireless communication, comprising:
a first receiver, receiving a first signaling and a second signaling; and
a first processor, transmitting a first radio signal;
wherein the first signaling comprises a first field, the second signaling comprises a second field; the first field and the second field are respectively composed of a positive integer number of bits; the second signaling is a Download Control Information (DCI), and the second signaling comprises first-type scheduling information of the first radio signal; the first field of the first signaling and the second field of the second signaling are jointly used for determining whether the first radio signal is related to the first signaling; the second signaling is transmitted on a Physical DownlinkControl Channel (PDCCH); the first radio signal is transmitted on a Physical Uplink Shared CHannel (PUSCH);
the first processor transmits a first reference signal, the first reference signal is a Sounding Reference Signal (SRS), wherein the first field of the first signaling and the second field of the second signaling are jointly used for determining that the first radio signal is related to the first signaling, the first signaling is used for determining second-type scheduling information of the first reference signal, the first reference signal comprises P first sub-signal(s), the P first sub-signal(s) is(are) transmitted respectively by P first-type antenna port(s), the first radio signal comprises K radio sub-signal(s), the K radio sub-signal(s) is(are) transmitted respectively by K second-type antenna port(s), multi-antenna related processing(s) of K first sub-signal(s) is(are) respectively used for determining multi-antenna related processing(s) of the K radio sub-signal(s), the K first sub-signal(s) is(are) a subset of the P first sub-signal(s), P is a positive integer, K is a positive integer no greater than the P.

12. The UE according to claim 11, wherein when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

13. The method according to claim 1, wherein the first signaling is a Radio Resource Control (RRC) signaling, and the first signaling is transmitted on a PDSCH.

14. The UE according to claim 11, wherein the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same spatial filtering.

15. The VE according to claim 11, wherein the second signaling comprises a third field, the third field comprises an SRS Resource Indicator (SRI), the third field of the second signaling is used for determining the K first sub-signal(s) out of the P first sub-signal(s).

16. A base station for wireless communication, comprising:
a first transmitter, transmitting a first signaling and a second signaling;
a processor, receiving a first radio signal;
wherein the first signaling comprises a first field, the second signaling comprises a second field; the first field and the second field are respectively composed of a positive integer number of bits; the second signaling is a Download Control Information (DCI), and the second signaling comprises first-type scheduling information of the first radio signal; the first field of the first signaling and the second field of the second signaling are jointly used for determining whether the first radio signal is related to the first signaling; the second signaling is transmitted on a Physical DownlinkControl Channel (PDCCH); the first radio signal is transmitted on a Physical Uplink Shared CHannel (PUSCH);
the processor receives a first reference signal, the first reference signal is a Sounding Reference Signal (SRS), herein, the first field of the first signaling and the second field of the second signaling are jointly used for determining that the first radio signal is related to the first signaling, the first signaling is used for determining second-type scheduling information of the first reference signal, the first reference signal comprises P first sub-signal(s), the P first sub-signal(s) is(are) transmitted respectively by P first-type antenna port(s), the first radio signal comprises K radio sub-signal(s), the K radio sub-signal(s) is(are) transmitted respectively by K second-type antenna port(s), multi-antenna related processing(s) of K first sub-signal(s) is(are) respectively used for determining multi-antenna related processing(s) of the K radio sub-signal(s), the K first sub-signal(s) is(are) a subset of the P first sub-signal(s), P is a positive integer, K is a positive integer no greater than the P.

17. The base station according to claim 16, wherein when a value of the second field of the second signaling is equal to a value of the first field of the first signaling, the first radio signal is related to the first signaling; when the value of the second field of the second signaling is unequal to the value of the first field of the first signaling, the first radio signal is unrelated to the first signaling.

18. The method according to claim 1, wherein the first signaling is a Radio Resource Control (RRC) signaling, and the first signaling is transmitted on a PDSCH.

19. The base station according to claim 16, wherein the phrase that multi-antenna related processing(s) of the K first sub-signal(s) is(are) respectively used for determining multi-antenna related processing(s) of the K radio sub-signal(s) means that any of the K second-type antenna port(s) and a corresponding first-type antenna port correspond to a same spatial filtering.

20. The base station according to claim 16, wherein the second signaling comprises a third field, the third field comprises an SRS Resource Indicator (SRJ), the third field of the second signaling is used for determining the K first sub-signal(s) out of the P first sub-signal(s).

* * * * *